United States Patent
Cornwell

(10) Patent No.: US 7,540,304 B2
(45) Date of Patent: Jun. 2, 2009

(54) ELASTOMERIC CHECK VALVE

(75) Inventor: James P. Cornwell, Erie, PA (US)

(73) Assignee: R. Conrader Company, Erie, PA (US)

( * ) Notice: Subject to any disclaimer, the term of this patent is extended or adjusted under 35 U.S.C. 154(b) by 498 days.

(21) Appl. No.: 11/108,501

(22) Filed: Apr. 18, 2005

(65) Prior Publication Data

US 2005/0229979 A1  Oct. 20, 2005

Related U.S. Application Data

(60) Provisional application No. 60/563,318, filed on Apr. 19, 2004.

(51) Int. Cl.
F16K 15/14 (2006.01)
F04B 53/10 (2006.01)

(52) U.S. Cl. .................. 137/860; 137/903; 417/566

(58) Field of Classification Search ............ 137/512.15, 137/860, 903; 417/566
See application file for complete search history.

(56) References Cited

U.S. PATENT DOCUMENTS

| 1,328,474 | A | * | 1/1920 | Astrom ................... 417/566 |
| 1,366,151 | A |   | 1/1921 | Astrom |
| 2,313,284 | A | * | 3/1943 | Valentine ................. 417/566 |
| 2,407,792 | A | * | 9/1946 | McMillan ................. 417/566 |
| 2,561,009 | A |   | 7/1951 | Byers et al. ............... 60/54.6 |
| 2,614,793 | A |   | 10/1952 | Storm ..................... 251/119 |
| 3,297,106 | A | * | 1/1967 | Hansen et al. ............. 137/860 |
| 3,298,394 | A |   | 1/1967 | Chorkey .................. 137/525 |
| 3,451,422 | A |   | 6/1969 | Chorkey .................. 137/525 |
| 3,493,270 | A |   | 2/1970 | Doerfler ................... 303/6 |
| 3,729,021 | A |   | 4/1973 | Humphrey ................ 137/525 |
| 3,857,405 | A |   | 12/1974 | Heideman ................ 137/269.5 |
| 3,924,831 | A |   | 12/1975 | Andrich .................. 251/149.7 |
| 4,000,857 | A |   | 1/1977 | Moen ..................... 239/428.5 |

(Continued)

FOREIGN PATENT DOCUMENTS

WO     WO 00/19134     * 4/2000

OTHER PUBLICATIONS 1 page from www.flairline.com—Flairline catalog of O-Check and Right Angle Flow Control Valves—visited approximately Jul. 2002.

*Primary Examiner*—John Rivell
(74) *Attorney, Agent, or Firm*—Jon L. Woodard, Esq.; MacDonald Illig Jones & Britton LLP

(57) ABSTRACT

A check valve includes a valve body having an inlet end through which air enters the valve and a valve cavity extending through the valve body and leading to an outlet end. A valve assembly is located at a position that enables control of the flow of air through the valve cavity. The valve assembly includes a tapered section having a cross section that increases in diameter in a direction that is downstream from the inlet end of the valve and which may be included as part of a plug. An elastomeric seal is mounted around the tapered section to reciprocate on the tapered section, with the tapered section biasing the elastomeric seal to a normal position at which the seal comes into sealing contact with both the valve body and tapered section to prevent the downstream flow of air from the inlet end out the outlet end.

86 Claims, 12 Drawing Sheets

U.S. PATENT DOCUMENTS

| | | | |
|---|---|---|---|
| 4,237,935 A | 12/1980 | Deimonte et al. | 137/860 |
| 4,344,637 A | 8/1982 | Williams et al. | 280/21 |
| 4,416,287 A | 11/1983 | Riester | 128/685 |
| 4,418,924 A | 12/1983 | Mack | 277/177 |
| 4,549,565 A | 10/1985 | Short | 137/71 |
| 4,673,000 A | 6/1987 | Haerr et al. | 137/860 |
| 4,722,731 A | 2/1988 | Vailancourt | 604/122 |
| 4,795,173 A | 1/1989 | Osborne | 277/168 |
| 5,040,905 A | 8/1991 | Boyd | 384/130 |
| 5,111,736 A | 5/1992 | Buchberger et al. | 92/168 |
| 5,127,804 A | 7/1992 | Chappell | 417/231 |
| 5,237,971 A | 8/1993 | Worsley | 123/188.6 |
| 5,257,646 A | 11/1993 | Meyer | 137/505.25 |
| 5,299,598 A | 4/1994 | Quartana et al. | 137/540 |
| 5,762,103 A | 6/1998 | Gregoire | 137/512.15 |
| 5,782,269 A | 7/1998 | Seaney et al. | 137/630.22 |
| 5,839,765 A | 11/1998 | Carter et al. | 285/334.2 |
| 5,875,815 A | 3/1999 | Ungerecht et al. | 137/505.25 |
| 5,941,537 A | 8/1999 | Wallace et al. | 277/642 |
| 5,975,507 A | 11/1999 | Cotter | 267/64.28 |
| 6,186,477 B1 | 2/2001 | McCombs et al. | 251/323 |
| 6,298,873 B1 | 10/2001 | LeVey et al. | 137/493 |
| 2004/0084091 A1 | 5/2004 | Kerger et al. | 137/538 |
| 2004/0194835 A1 | 10/2004 | Gabriel | 137/625.69 |

\* cited by examiner

Open

Closed

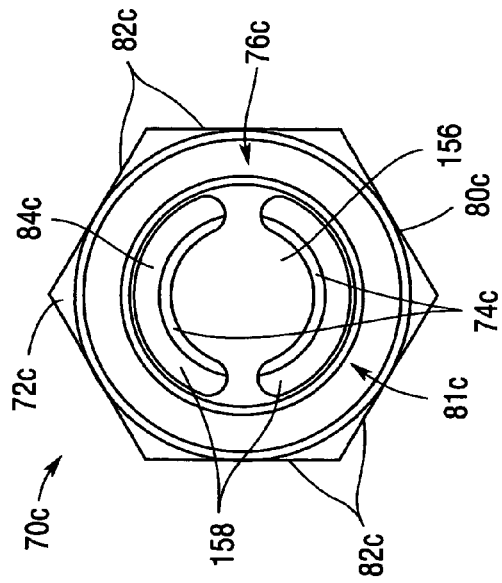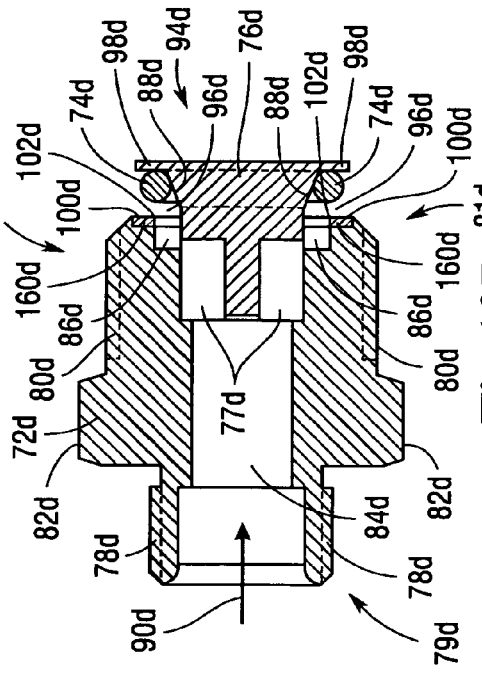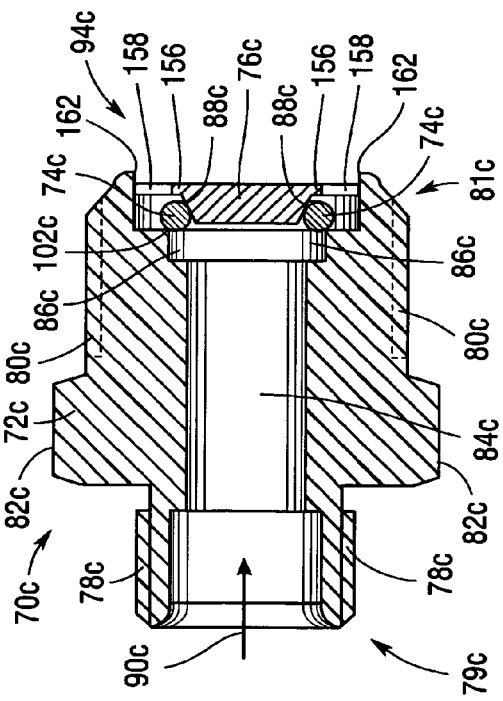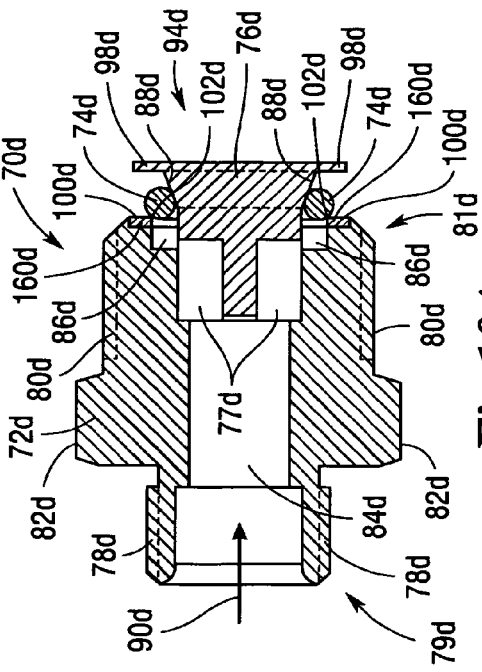

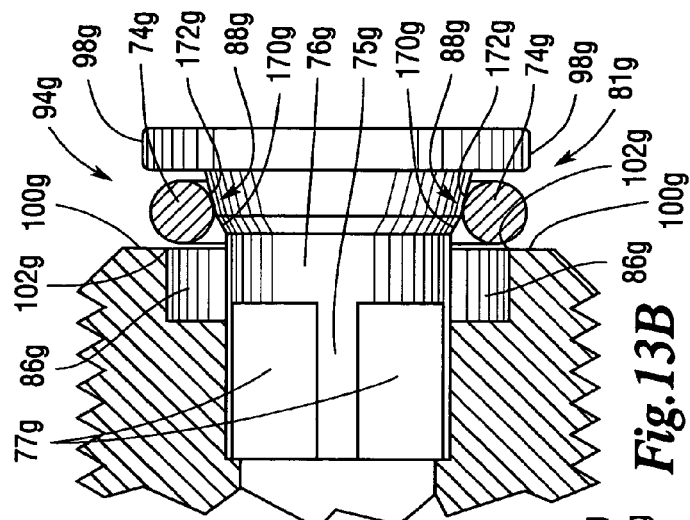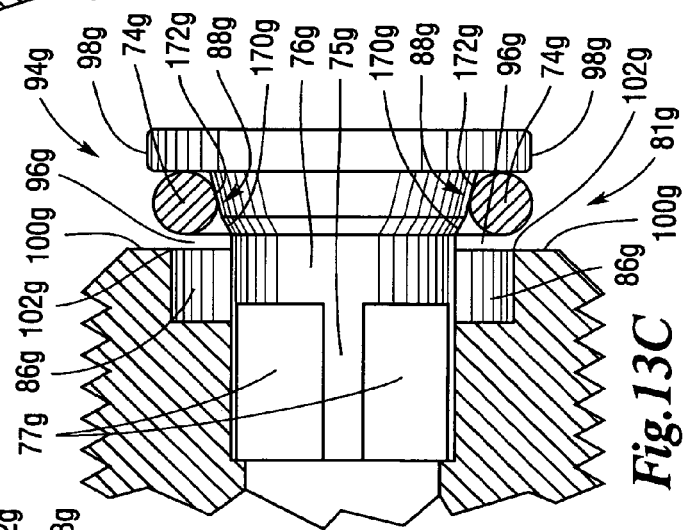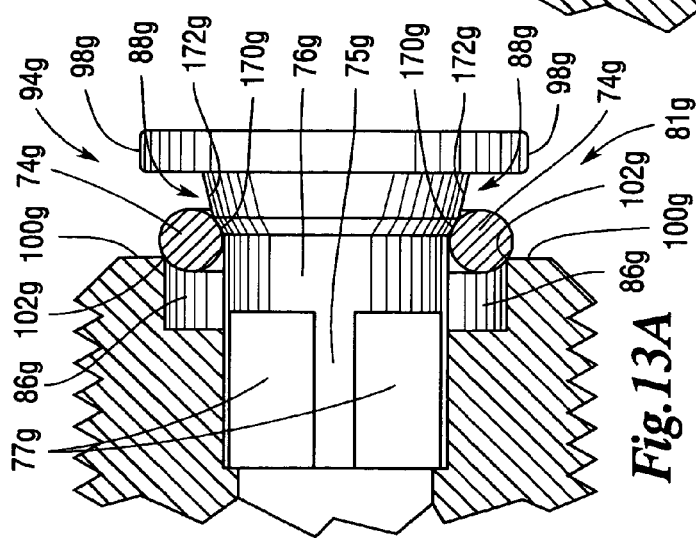

ELASTOMERIC CHECK VALVE

This application claims the benefit of U.S. Provisional Application No. 60/563,318 filed on Apr. 19, 2004, which is incorporated herein by reference.

BACKGROUND

Check valves are used in a variety of applications in air compressor systems to allow for the unidirectional passage of upstream pressurized air, that is, pressurized air upstream of the antler of a check valve, above a particular preselected threshold pressure level. The amount of upstream pressure required to initially begin the opening of a check valve against the force of a spring holding it shut is known as the cracking pressure.

Compressor systems are manufactured in a broad range of sizes and capacities that allow for air deliveries that vary from less than 1 Standard Cubic Feet per Minute ("SCFM") to 100 SCFM and larger. However, individual components of the compressor system, such as attachment fittings, discharge tubes, check valves, and other channeling devices, must be sized and otherwise configured to adequately allow the air delivered by the system's compressor pump to be effectively and continuously removed downstream of the components to prevent a buildup of backpressure which could lead to inefficient system operation or possibly damage to the compressor pump or other system components.

For this reason it is desirable for check valves to be configured to operate with low cracking pressures to prevent a significant portion of the pressure produced by a compressor pump from being lost as back pressure resulting from opening a check valve. Check valves are therefore preferably configured to open and operate with very low cracking pressures. Once partially or fully opened, a check valve must also be capable of allowing air to continuously move downstream to prevent a substantial accumulation of backpressure produced by the compressor pump upstream of the check valve.

Expandable o-ring style check valves are desirable to use since they have an inherent advantage in that they combine a check valve spring and sealing member into one component. However, a number of previous o-ring style check valves, such as those in which air pressure is exerted outwardly against the o-ring in a radial direction, have been limited in that their design inherently requires relatively large cracking pressures for operation. Other types of o-ring style check valves have proven to be unsuited for preventing substantial accumulations of backpressure upstream of the check valve. While some of these valve types have proven to be suitable for allowing for the passage of smaller control flows of air, such as those flow rates that are suitable for performing pneumatically controlled logic operations, they are often unsuitable for allowing the passage of larger process flows of air, such as those used to effect the operation of mechanical devices and fluid-driven processes.

For example, FIG. 1 is a cross sectional view of a bidirectional check valve 30 of the prior art that is configured to allow air pressure from an upstream supply tube 32 passing through a first air space 33 to flow through a single, small first hole 34 to a second air space 36. A single, small second hole 38 allows air pressure to flow from the second air space 36 to the first air space 33. The check valve 30 extends between the first and second air spaces 33 and 36 and a valve seal 39 seals against a divider 37. O-rings 42 and 40 are biased by the spring force of each o-ring 42 and 40 against tapered sections 44 and 46 to normal positions against seats 49 and 48 (as shown) to prevent air flow between the upstream supply tube 32, second air space 36, and first air space 33 through the first hole 34 and second hole 38. Valve pressure chambers 41 and 43 are the spaces that exist between the o-rings 40 and 43, tapered sections 46 and 44, and seats 48 and 49.

When air flows through the first hole 34 or through the second hole 38, the o-rings 42 and 40 move up the tapered sections 44 and 46, respectively, pushed by the air against the spring force of these o-rings to allow air to pass into the first and second air spaces 33 and 36. There is only one first hole 34 and only one second hole 38 to provide paths for the flowing streams of air between the upstream supply tube 32 and second air space 36 and between the second air space 36 and first air space 33, and the sizes of the first hole 34 and second hole 38 are very small compared to the cross sectional size of the upstream supply tube 32. Normally, when a substantial amount of pressure is produced by a compressor pump in an air compressor system and forced through the upstream supply tube 32 toward the check valve 30, the check valve 30 does not allow a sufficient amount of air to move from the supply tube 32 to prevent a substantial accumulation of upstream backpressure, unless the size of the check valve 30 is significantly increased to make the cross sectional sizes of the first and second holes 34 and 38 more proportionate with the cross sectional size of the supply tube 32. Such an increase in size would greatly increase the cost while reducing the practicality of the check valve 30. In the depicted configuration, the relatively small sizes of the first hole 34 and second hole 38 could be sufficient for allowing smaller control flows of air for logic operations, but due to the proportionately larger size of the upstream supply tube 32, it would normally be unsuitable for accommodating larger process flows of air.

Since there is only one first hole 34 and only one second hole 38 to supply air pressure to the valve pressure chambers 43 and 41 for moving each o-ring 42 or 40 along the tapered sections 44 and 46, respectively, if the check valve 30 is incorporated into an air compressor system, in which air is compressed by a reciprocating piston, the normal rapid rise and fall of pressure caused by the piston can cause an uneven or erratic application of force to be applied against each o-ring 42 or 40 in the valve pressure chambers 43 or 41. This may result in an uncontrolled pulsation of the pressurized stream flowing through the check valve 30. The greatest amount of force from the upstream air pressure is applied against each o-ring 42 or 40 at a location nearest the first or second holes 34 or 38, possibly causing each o-ring 42 or 40 to assume an angled position on the tapered section 44 or 46, potentially leading to sticking or uneven wear and stressing of the o-ring 42 or 40.

If the rate of flow and pressure of the air stream that continues to flow from the first hole 34 or second hole 38 into a valve pressure chamber 43 or 41 is too low, a portion of an o-ring 42 or 40 may not remain in a position away from its respective seat 49 or 48, the o-ring 42 or 40 resting completely against the seat 49 or 48 and sealing the valve pressure chamber 43 or 41. Pressure in the valve pressure chamber 43 or 41 will again increase to a level sufficient to force the o-ring 42 or 40 away from the seat 49 or 48 due to the pressure flowing from the first hole 34 or second hole 38. The o-ring 42 or 40 will then in turn again move along the tapered section 44 or 46 away from the seat 49 or 48 and the cycle will be repeated.

FIG. 2 is a cross sectional view of a prior art check valve 50 having a threaded shank member 52 that engages the inside threads 54 of a valve cavity 56. The shank member 52 includes a tapered section 63 on which the o-ring 62 is reciprocally mounted. While FIG. 2 shows the check valve 50 in an open position in which an annular opening 68 allows air to pass between an o-ring 62 and face 64 of the check valve, the o-ring 62 has a spring force that biases the o-ring 62 along the tapered section 63 to seal against the face 64 and prevent the flow of air through the valve 50. The fitting between the shank member 52 and inside threads 54 is sufficiently loose that a leakage clearance 58 exists between the mating threads, permitting air to flow from an upstream position 60 in the check valve 50 past the shank member 52, causing the o-ring 62 to release its seal against the face 64 of the check valve 50 to permit the air to exit the check valve 50. However, since the leakage clearance 58 is small in comparison with the amount of air that would typically be fed by the compressor pump to the valve via the upstream position 60, the leakage clearance 58 cannot alone allow for the passage of a sufficient amount of air from the upstream position 60 to the o-ring 62 to prevent a substantial accumulation of upstream backpressure unless the check valve 30 is increased to an impractically large size. In the depicted configuration, the relatively small size of the leakage clearance 58, while possibly being sufficient for allowing smaller control flows of air for logic operations, would normally be insufficient for accommodating larger process flows of air due to the proportionately larger size of the upstream cross sectional area of the valve cavity 56.

The leakage clearance 58 is also insufficient to supply enough air to cause the o-ring 62 to remain in an open position during operation. A pressure chamber 66 is created between the o-ring 62, shank member 52, and face 64 when the o-ring 62 is closed. Air passing through the leakage clearance 58 increases the air pressure within the pressure chamber 66 to cause the o-ring 62 to move away from its seal against the face 64, creating an annular opening 68 that allows air to exit the check valve 50. However, the annular opening 68 is much larger than the leakage clearance 58 and allows air in the pressure chamber 66 to escape at a rate that is much greater than the rate at which it can be replaced, starving the pressure chamber 66 until it no longer contains sufficient air pressure to force the o-ring 62 up the tapered portion 63 and away from sealing against the face 64. Pressure again begins to increase in the pressure chamber 66 after the o-ring 62 returns to seal against the face 64 and accumulates until it is sufficient to again move the o-ring 62 outward on the tapered section 63. Depending on the application, this repeated process can lead to cycling when the check valve should be open that can cause a pulsating flow of the pressurized stream and premature wear of the o-ring 62 and other components of an air compressor system.

The cracking pressures required for the operation of such check valves can also be substantially greater than a desirable level due to o-ring distortion or limitations on available o-ring surface area. For example, in the check valve 30 of FIG. 1, each o-ring 42 or 40, due to its elastomeric interaction with the tapered sections 44 or 46, is configured to seal against a flat seat 48 or 49 when air does not flow through the first or second holes 34 or 38. Similarly, in the check valve 50 of FIG. 2, the o-ring 62 seals flatly against the face 64 until the pressure chamber 66 accumulates sufficient air pressure to push the o-ring 62 away from the face 64 up the tapered section 63. In both valves 30 and 50, the flattening of elastic o-ring material against the seat 48 or 49 or face 64 reduces the amount of external o-ring surface area that is exposed to the upstream air pressure when each valve 30 or 50 is closed. Since the cracking pressure of an o-ring seal is inversely related to the amount of surface area exposed to airflow that contacts the seal, a reduction in the exposed o-ring surface area significantly increases the cracking pressure of the valve.

SUMMARY

The invention includes a check valve for use in an air compressor system that includes an air compressor having a compression cylinder. A valve body includes an inlet end through which air enters the valve and a valve cavity extending through the valve body and leading to an outlet end. A valve assembly is located at a position with respect to the valve cavity that enables the valve assembly to control the flow of air through the valve cavity. The valve assembly includes a tapered section having a cross section that increases in diameter in a direction that is downstream from the inlet end of the valve and which may be included as part of a plug. An elastomeric seal is mounted around the tapered section to reciprocate on the tapered section, with the tapered section biasing the elastomeric seal to a normal position at which the seal comes into sealing contact with both the valve body and tapered section to prevent the downstream flow of air from the inlet end out the outlet end of the valve body.

The valve assembly allows air to flow downstream from the inlet end and out the outlet end of the of the valve body when the air compressor produces an amount of air pressure necessary to create a force against the elastomeric seal that is sufficient to cause the seal to move to a position that is located away from the valve body along the tapered section. This creates a preselected clearance between the valve body and seal.

The portion of the valve cavity between the inlet end and the location where the elastomeric seal normally contacts the valve body has a cross sectional area that is sized to such an extent that when repeated cycles of the compression cylinder of the air compressor repeatedly cause the seal to be located at a position away from the valve body and create the preselected clearance between the valve body and the seal, the pressure of air flowing through the preselected clearance continues to be sufficient to continuously remove air from the valve cavity to prevent a substantial accumulation of back pressure produced by the air compressor upstream of the valve.

In some embodiments, the valve body includes an inside chamfer in the valve cavity that increases in diameter in a direction that is downstream from the inlet end, with the elastomeric seal being biased to contact and seal against the valve body at the chamfer.

Other embodiments of the invention also include a pressure chamber located at or near the outlet end of the valve cavity, with an edge of the pressure chamber being located where an inside surface of the pressure chamber intersects a face of the valve body at or near the outlet end. In such embodiments, the tapered section can bias the elastomeric seal to a normal position that places the seal in sealing contact with the edge of the pressure chamber to maximize, when the seal is in the normal position, the amount of surface area of the seal that is exposed to upstream air pressure. Alternatively, an edge can be formed from a flange or similar structure, such as a compression fit washer or other flange extension that extends inwardly as part of the valve body into the valve cavity.

Those skilled in the art will realize that this invention is capable of embodiments that are different from those shown and that details of the structure of the disclosed check valve can be changed in various manners without departing from the scope of this invention. Accordingly, the drawings and descriptions are to be regarded as including such equivalent check valves as do not depart from the spirit and scope of the invention.

BRIEF DESCRIPTION OF THE DRAWINGS

For a more complete understanding and appreciation of this invention, and many of its advantages, reference will be made to the following detailed description taken in conjunction with the accompanying drawings.

FIG. 9A is a side cross sectional view of a check valve according to one embodiment of the invention;

FIG. 9B is a front view of the check valve of FIG. 9A;

FIG. 10A is a side cross sectional view of a check valve according to one embodiment of the invention having an elastomeric seal in a normal position;

FIG. 10B is a side cross sectional view of the check valve of FIG. 10A depicting a preselected clearance that is a valve clearance between the elastomeric seal and an edge of the valve body;

FIG. 13A is a side cross sectional view of an outlet end of a check valve according to one embodiment of the invention having an elastomeric seal in a normal position;

FIG. 13B is a side cross sectional view of the check valve of FIG. 13A depicting a preselected clearance between the elastomeric seal and an edge of the valve body;

FIG. 13C is a side cross sectional view of the check valve of FIG. 13A depicting a preselected clearance that is a valve clearance between the elastomeric seal and an edge of the valve body;

DETAILED DESCRIPTION

Figure 1:
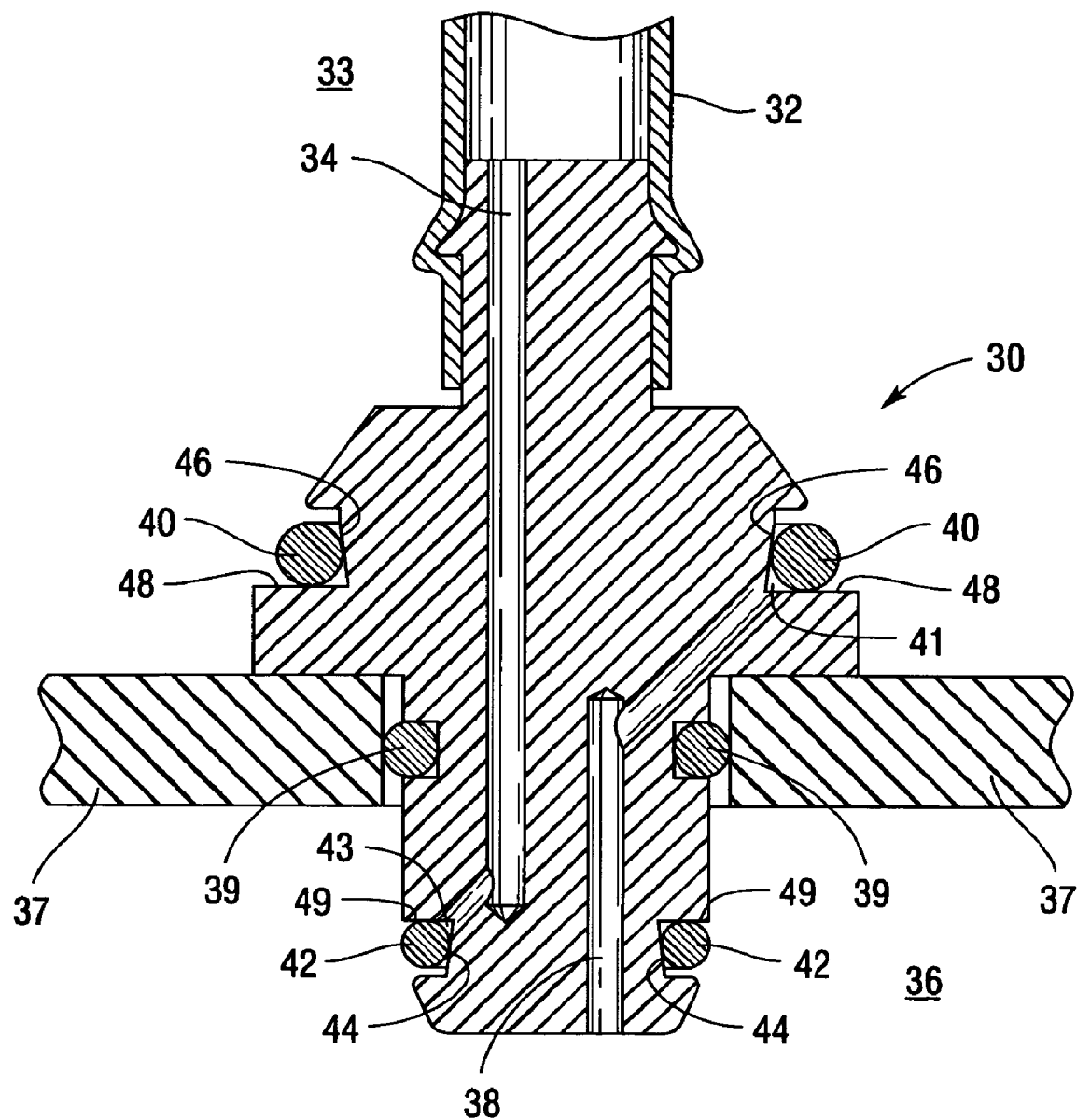
FIG. 1 depicts a prior art check valve.
Figure 2:
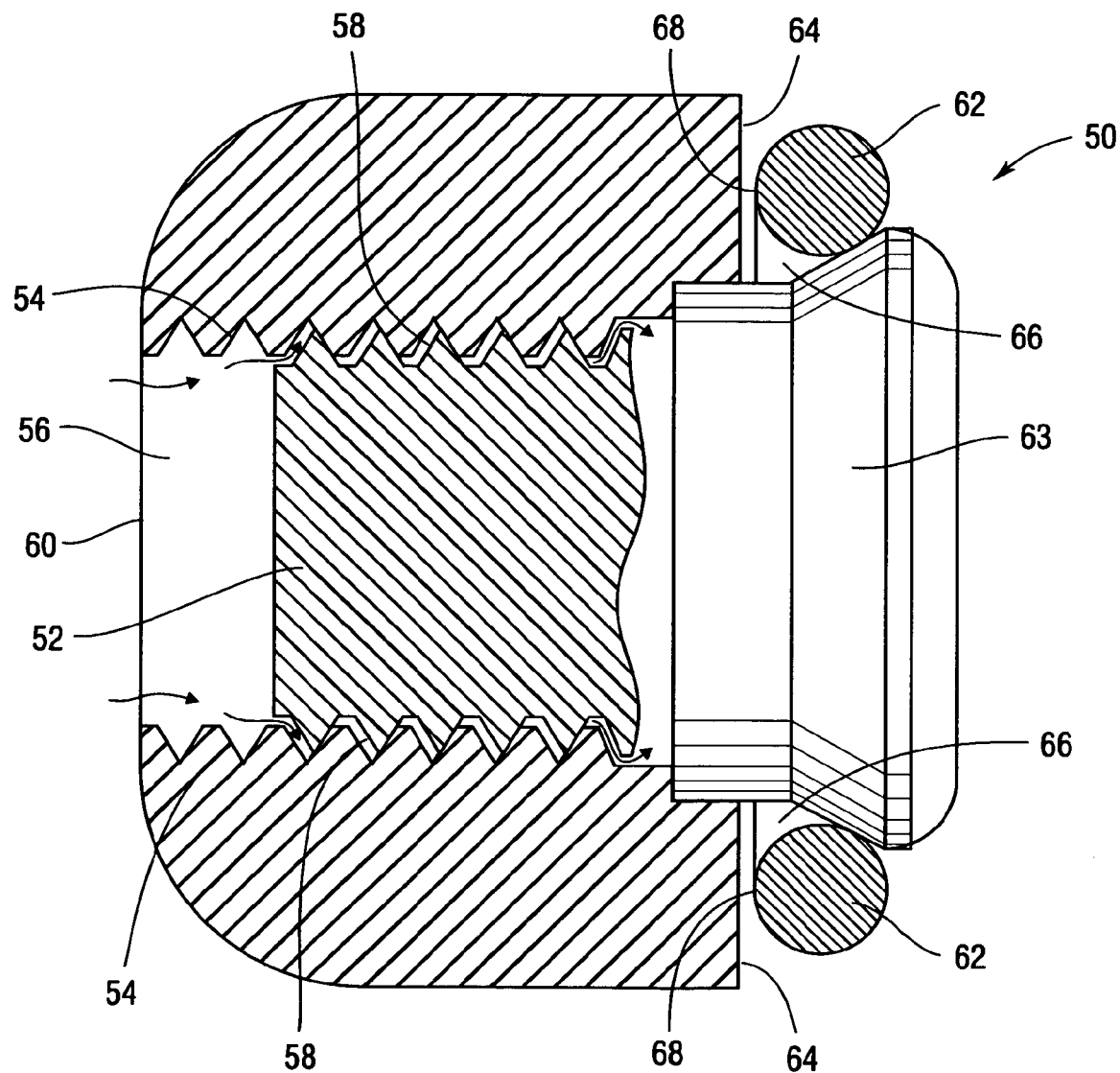
FIG. 2 depicts a prior art check valve.

Referring to the drawings, similar reference numerals are used to designate the same or corresponding parts throughout the several embodiments and figures. Specific embodiment variations in corresponding parts are denoted with the addition of lower case letters and/or single or multiple prime indicators to reference numerals.

Figure 3:
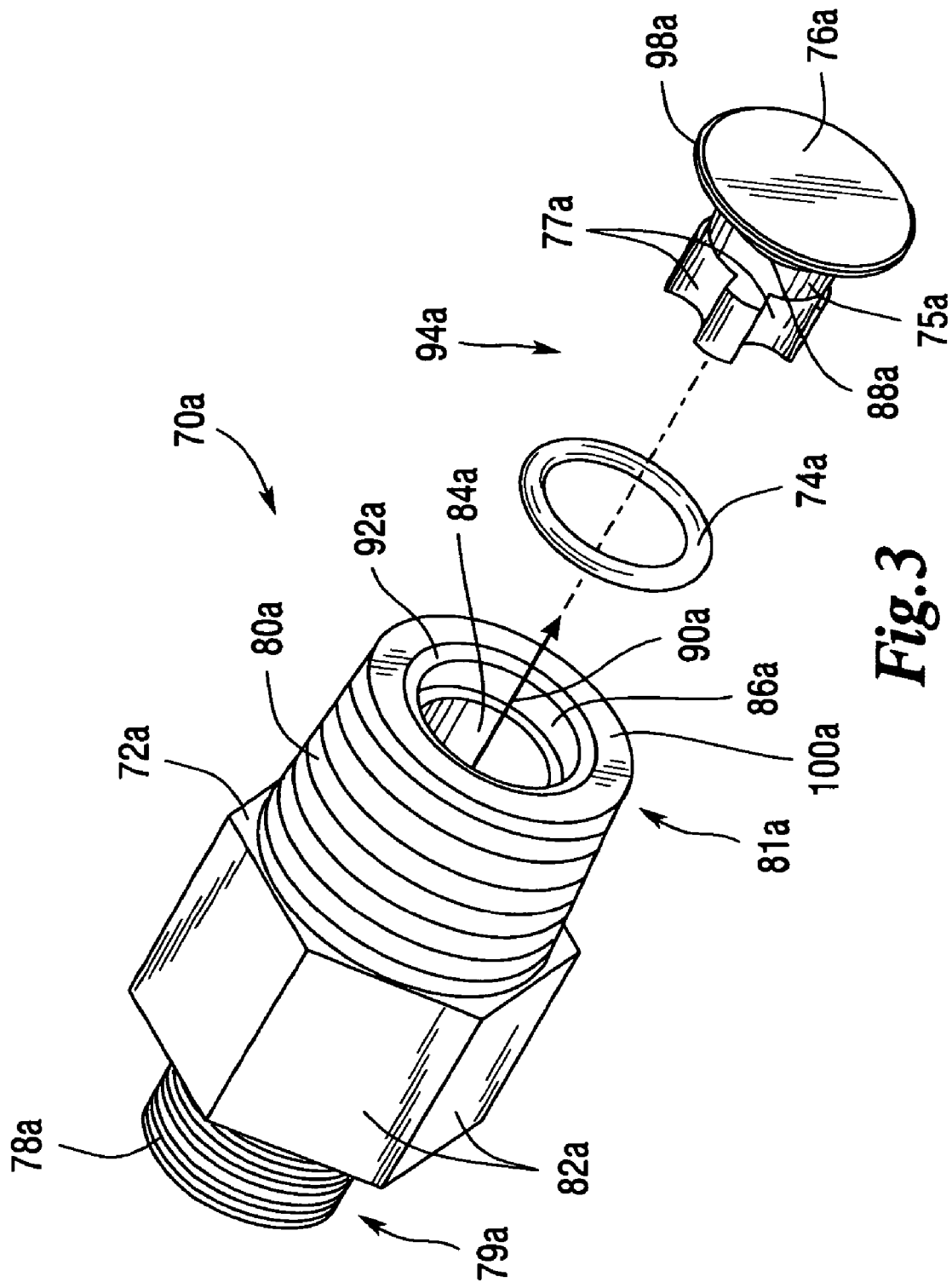
FIG. 3 is an exploded perspective view of a check valve according to one embodiment of the invention.

FIG. 3 is an exploded perspective view of a check valve 70 of the invention depicting an exterior view of a valve body 72a. A valve assembly 94a includes an elastomeric seal 74a and plug 76a. The plug 76a includes a shaft 75a having multiple flutes 77a positioned to function as air passages when the plug 76a is inserted into a valve cavity 84a of the valve body 72a. The valve body 72a includes upstream threads 78a located at an inlet end 79a of the valve body 72a and downstream threads 80a located at an outlet end 81a of the valve body 72a. The upstream and downstream threads 78a and 80a allow for attachment to other components of an air compressor system along a path of flowing air. Engagement surfaces 82a allow for installation of the valve body 72a into the air compressor system using a wrench or other suitable installation tool.

Figure 4B:
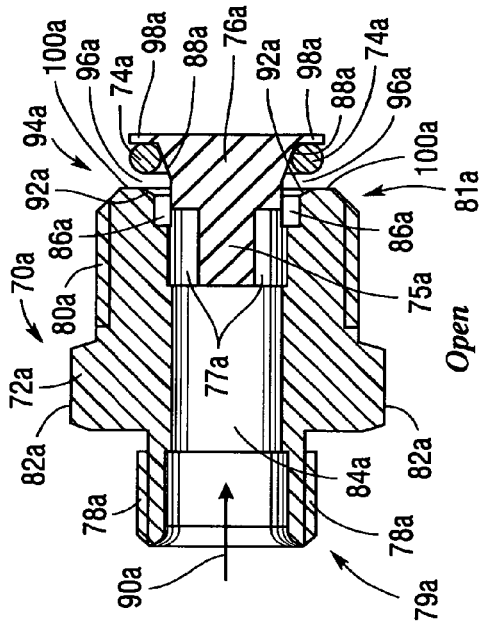
FIG. 4B is a side cross sectional view of the check valve of FIG. 3 depicting a preselected clearance that is a valve clearance between the elastomeric seal and an edge of the valve body.
Figure 5B:
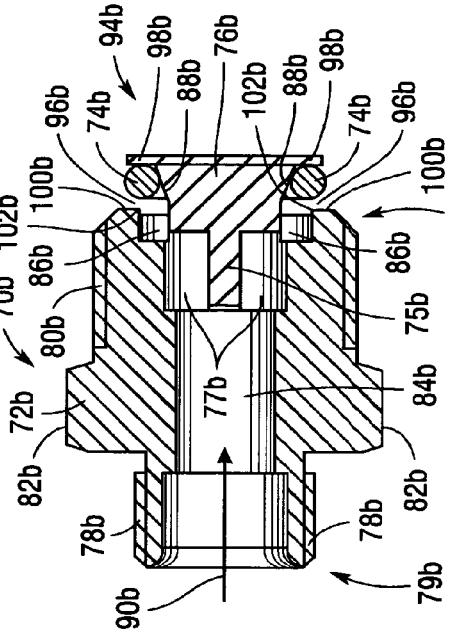
FIG. 5B is a side cross sectional view of the check valve of FIG. 5A depicting a preselected clearance that is a valve clearance between the elastomeric seal and an edge of the valve body.
Figure 4A:
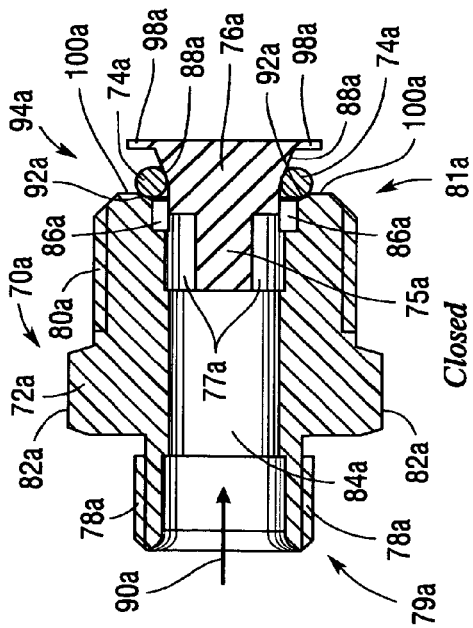
FIG. 4A is a side cross sectional view of the check valve of FIG. 3 depicting an elastomeric seal in a normal position.

As best understood with reference to the assembled side cross sectional view of the check valve 70a depicted in FIGS. 4A and 4B, the valve cavity 84a extends through the valve body 72a from the inlet end 79a to the outlet end 81a and is intended to allow air to pass in a direction 90a that is downstream from the inlet end 79a. A pressure chamber 86a is the portion of the valve cavity 84a that is located upstream from and adjacent the elastomeric seal 74a.

The elastomeric seal 74a is mounted around a tapered section 88a of the plug 76a to reciprocate on the tapered section 88a. Due to an elastic spring force creating a memory seal shape, the internal diameter of the elastomeric seal 74a, when assuming its memory seal shape, is slightly less than the smallest diameter of the plug 76a that the elastomeric seal 74a surrounds when positioned along the tapered section 88a. As a result, the elastomeric seal 74a maintains a sealing fit against the plug 76a to prevent the passage of air therebetween. The tapered section 88a has a cross section that increases in diameter in the direction 90a, that is away from the face 100a of the valve body 72a and downstream from the inlet end 79a of the valve body 72a. When the elastomeric seal 74a moves along the tapered section 88a in the downstream direction 90a, the tapered section 88a expands the elastomeric seal 74a in an outwardly radial direction from the tapered section 88a, as shown in FIG. 4B. Due to the spring force of the elastomeric seal 74a that opposes this radial expansion, the tapered section 88a biases the elastomeric seal 74a to a normal position, as shown in FIG. 4A.

When the elastomeric seal 74a is in the normal position, the seal 74a contacts the valve body 72a at an inside chamfer 92a of the valve cavity 84a. The chamfer 92a has a cross section that increases in diameter in the direction 90a that is downstream from the inlet end 79a of the valve body 72a. While the elastomeric seal 74a is in the normal position, the curvature of the elastomeric seal 74a partially fits into and seals with the chamfer 92a, preventing the flow of air therebetween. Since the elastomeric seal 74a, when in contact with the chamfer 92a, seals against both the valve body 72a and the tapered section 88a of the plug 76a, the seal 74a prevents the passage of air through the outlet end 81a when in the normal position to close the check valve 70a.

Consider the check valve 70a when used with an air compressor system in which a compressor pump (not shown in FIGS. 4A and 4B) forces air to enter the check valve 70a through the inlet end 79a. Referring to FIG. 4A, as the compressor pump begins to pressurize the valve cavity 84a, the amount of force exerted by the increased pressure against the elastomeric seal 74a is directly related to the amount of surface area of the seal 74a that is exposed to the valve cavity 84a and the amount of pressure produced by the compressor pump. Since the seal 74 is in the normal position, the amount of surface area of the seal 74a that is in contact with the chamfer 92a will affect the amount of surface area of the seal 74a that remains exposed to air pressure from the valve cavity 84a.

Since the seal 74a has a memory shape and is elastic, any shape distortions of the exposed surface of the seal 74a caused by contact with the chamfer 92a or other part of the valve body 72a can also affect the amount of surface area that remains exposed to air pressure from the valve cavity 84a. However, since the curvature of the elastomeric seal 74a partially fits into and seals with the chamfer 92a, distortion resulting from compression and flattening of the outside surface of the seal 74a against the valve body 72a is substantially reduced due to the fit against the chamfer 92a. A substantially greater amount of surface area of the seal 74a remains exposed to the valve cavity 84a as a result, significantly increasing the effective force of air pressure that acts against the seal 74a for any given level of air pressure in the valve cavity 84a. This in turn significantly reduces the cracking pressure, which is the minimum level of air pressure that must be present in the valve cavity 84a to create a cracking force against the seal 74a to initially move the seal 74a away from contact with the chamfer 92a and toward a position, which establishes a preselected clearance between the seal 74a and valve body 72a. The position of the seal 74a on the tapered section 88a exposes the seal 74a to the pressure chamber 86a so that the actual amount of force that the seal 74a is subjected to as a result of the air pressure that is present within the pressure chamber 86a causes the seal 74a to move on the tapered section 88a to create the preselected clearance between the seal 74a and valve body 72a. The maintenance of the preselected clearance continues to depend on the actual force exerted by the air pressure against the seal even if the magnitude of the force is not directly and proportionately related to the magnitude of air pressure in the valve cavity 84a and/or the pressure chamber 86a.

When the air pressure within the valve cavity 84a reaches the cracking pressure and exerts a cracking force against the elastomeric seal 74a, the seal 74a begins to move along the tapered section 88a of the plug 76a and away from contact with the chamfer 92a. This initial movement of the seal 74a is against the spring force that biases the seal 74a toward the normal position, the spring force being created by the memory shape of the seal 74a as it is stretched in a radial direction by the tapered section 88a.

As the elastomeric seal 74a moves away from contact with the chamfer 92a, an increased amount of surface area of the seal 74a becomes exposed to upstream air pressure from the compressor pump. Since the force exerted against the seal 74a is directly related to the amount of surface area that is exposed to air pressure moving downstream from the inlet end 79a, the amount of force exerted against the seal 74a will increase in direct proportion to the increase in the amount of surface area that becomes exposed due to the lost contact between the seal 74a and chamfer 92a. Therefore, once the seal 74a moves out of contact with the chamfer 92a, the amount of force exerted against the seal 74a will increase by virtue of the increased amount of exposed surface area of the seal 74a, even if the amount of air pressure produced by the compressor pump does not itself increase further. Once the contact between the seal 74a and chamfer 92a is lost, the subsequent movement of air through the open valve past the seal 74a will also create a dynamic force, in addition to the force produced by the upstream air pressure itself, that will further increase the total amount of force that is exerted against the seal 74a.

Due to the increased total forces that result from the lost contact between the chamfer 92a and seal 74a, it may be possible to reduce the air pressure produced by the air compressor to a level that is below the cracking pressure, once the seal 74a and chamfer 92a are out of contact, without causing the check valve 70 to close. However, due to the spring force of the seal 74a, the total force actually exerted against the seal 74a that is necessary to keep the seal 74a out of contact with the chamfer 92a and maintain a preselected clearance must be at least as great as the cracking force, which is the total force exerted against the seal 74a by the cracking pressure produced by the compressor pump when the seal 74a initially moves out of contact with the chamfer 92a. If at any time the total force exerted against the seal 74a falls below the cracking force, the spring force of the seal 74a will again seal against the chamfer 92a and close the check valve 70a.

If the force exerted against the elastomeric seal 74a continues to increase beyond the cracking force after the seal 74a and chamfer 92a lose contact, the seal 74a will continue to move against its bias along the tapered section 88a until the check valve 70a is opened fully and has reached a maximum preselected clearance or a "valve clearance" 96a between seal 74a and valve body 72a, as depicted in FIG. 4B. The minimum amount of air pressure that the compressor pump must produce and maintain in the valve cavity 84a of the check valve 70a to create sufficient clearance force against the seal 74a and maintain the check valve 70a in the fully open position is the clearance pressure of the check valve 70a. When the check valve 70a is fully open, the increased total amount of clearance force exerted against the seal 74a is partly due to the increased amount of surface area that is exposed to air from the compressor and also partly due to the dynamic force of the air as it passes the seal 74a.

When opened fully, the check valve 70a restricts further movement of the seal 74a with a restrictor 98a, which impedes further radial stretching and movement of the seal 74a in the downstream direction 90a. In this position, a valve clearance 96a exists between the valve body 72a and the elastomeric seal 74a, which is the maximum preselected clearance that the check valve 70a provides for the passage of air from the valve cavity 84a out the outlet end 81a of the valve body 72a. Since the total mount of force exerted against the seal 74a increases due to increased exposed surface area of the seal 74a and due to the dynamic forces of moving air, for some embodiments of the invention, the amount of air pressure that must be maintained in the valve cavity 84a to maintain the check valve 70a in a fully open position and to maintain the valve clearance 96a between the valve body 72a and the seal 74a may be an amount that is substantially less than the cracking pressure.

Referring to FIG. 4B, the portion of the valve cavity 84a that is between about the inlet and 79a and about the location where the elastomeric seal 74a contacts the body 72a is sized to have a cross sectional area that allows the pressure of the air flowing through the prescribed valve clearance 96a to be sufficient to continuously remove air from the valve cavity 84a so as to prevent a substantial accumulation of back pressure produced by the air compressor upstream of the check valve 70a, when repeated cycles of the air compressor's compression cylinder repeatedly cause the elastomeric seal 74a to be located at a position away from the valve body 72a to create the preselected valve clearance 96a. This holds true as the compressor pump maintains levels of air pressure in the valve cavity 84a up to and including the clearance pressure, even if the clearance pressure is greater than the cracking pressure. Since in FIG. 4B, the location where the seal 74a contacts the body 72a is the chamfer 92a and since the pressure chamber 86a of the valve cavity 84a is directly adjacent the chamfer 82a, the valve cavity 84a is directly open to clearances between the valve body 72a and elastomeric seal 74a via flutes 77a whenever the valve 70a is partially or fully open.

There will be a continuous flow of air from the valve cavity 84a through the clearance between the valve body 72a and seal 74a so long as the total force exerted on the seal 74a is at least as great as the clearance force. This configuration removes the possibility that air pressure within the pressure chamber 86a might "starve" or decrease at a rate that is greater than the pressure supplied by the valve cavity 84a, so that air pressure from the valve cavity 84a might decrease until it would become insufficient to maintain the preselected clearance 96a between the seal 74a and chamfer 92a. In accordance with one embodiment, the relationship between the size of the cross sectional area along the length of the valve cavity 84a and the preselected valve clearance 96a is determined empirically. However, check valves constructed as described above have operated satisfactorily with the cross sectional area of the valve cavity 84a about equal to or greater than that of the preselected clearance 96a. When the size of the cross sectional area of the length of the valve cavity is sized appropriately, the pressure chamber 86a can only starve if the compressor pump fails to maintain sufficient air pressure in the valve cavity 84a to produce sufficient force to remove contact between the seal 74a and chamfer 92a.

Referring to FIG. 4B, the valve clearance 96a is sufficient for the pressure of air flowing there through to continuously remove air from the valve cavity 84a through the outlet end 81a of the valve body 72a. This continues to occur throughout the repeated cycles of the compression cylinder of the compressor pump. Since the valve cavity 84a is directly open, via the flutes 77a and pressure chamber 86a, to the valve clearance 96a, there is no substantial obstruction to prevent the continuous removal of air from the valve cavity 84a through the outlet end 81a of the valve body 72a to prevent substantial accumulation of back pressure in the valve cavity 84a or upstream of the check valve 70a.

As the compressor pump continues to pressurize the valve cavity 84a to maintain an air pressure level that is sufficient to maintain a cracking force against the seal 74a, the preselected clearance 96a will continue to exist between the seal 74a and valve body 72a. If movement of the seal 74a in the downstream direction 90a to locations along the tapered section 88a that are away from the valve body 72a results in significant additional amounts of backpressure in the valve cavity 84a, the resulting smaller clearance between the seal 74a and valve body 72a will still allow the pressure of air flowing through the clearance between the seal 74a and valve body 72a to remove sufficient amounts of air from the valve cavity 84a to prevent substantial accumulation of back pressure. Referring to FIG. 4B, the pressure of air flowing through a valve clearance reduced in size from the preselected valve clearance 96a continues to be sufficient to continuously remove air from the valve cavity 84a to prevent substantial accumulation of back pressure whenever the compressor pump produces a clearance pressure.

The ability of the check valve 70a to operate without substantial accumulations of back pressure from the valve cavity 84a enables the valve 70a to be used to pass process flows of air from the inlet end 79a through the outlet end 81b of the valve body 72a without creating substantial back pressure. Process flows of air generally involve the movement of substantial volumes of air such as those used to effect the operation of mechanical devices and fluid-driven processes. The ability of the check valve 70a to admit large amounts of air through the preselected clearance 96a between the valve body 72a and elastomeric seal 74a enables the check valve 70a to perform this function.

Figure 6:
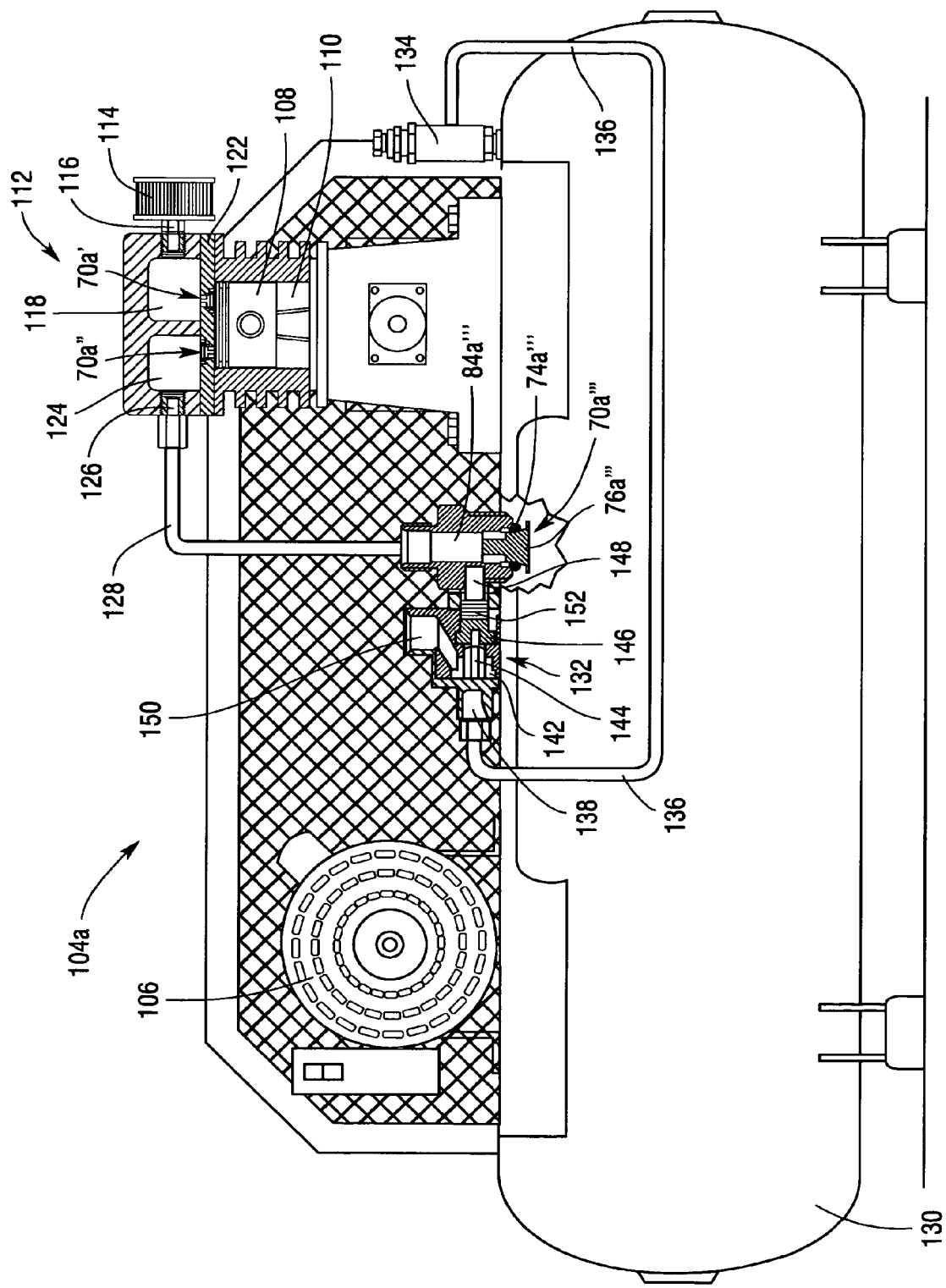
FIG. 6 is a side partial cross sectional view of an air compressor system incorporating check valves according to the invention.
Figure 7:
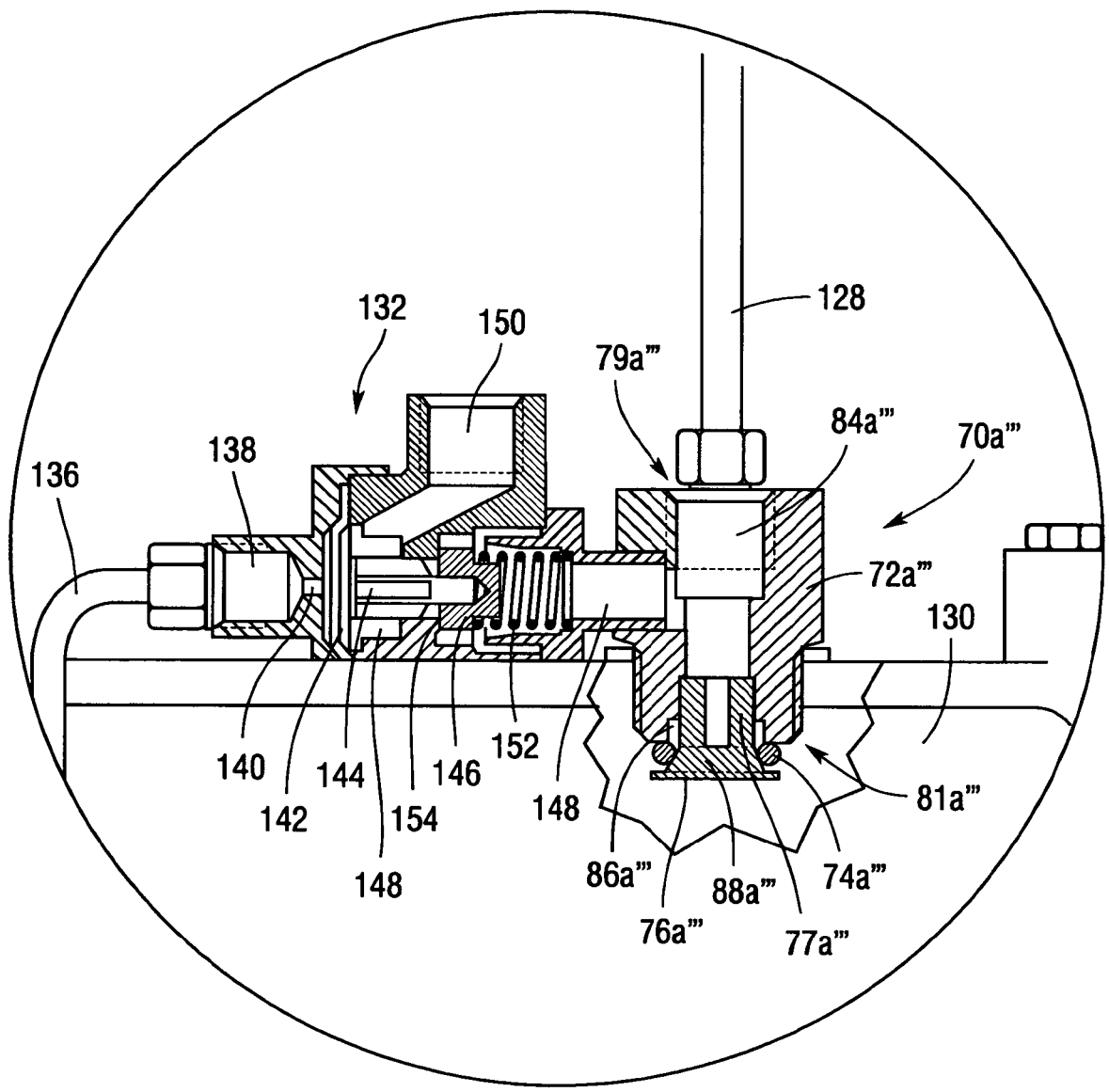
FIG. 7 is a magnified side partial cross sectional view of unloader and check valves included in the air compressor system of FIG. 6.
Figure 8:
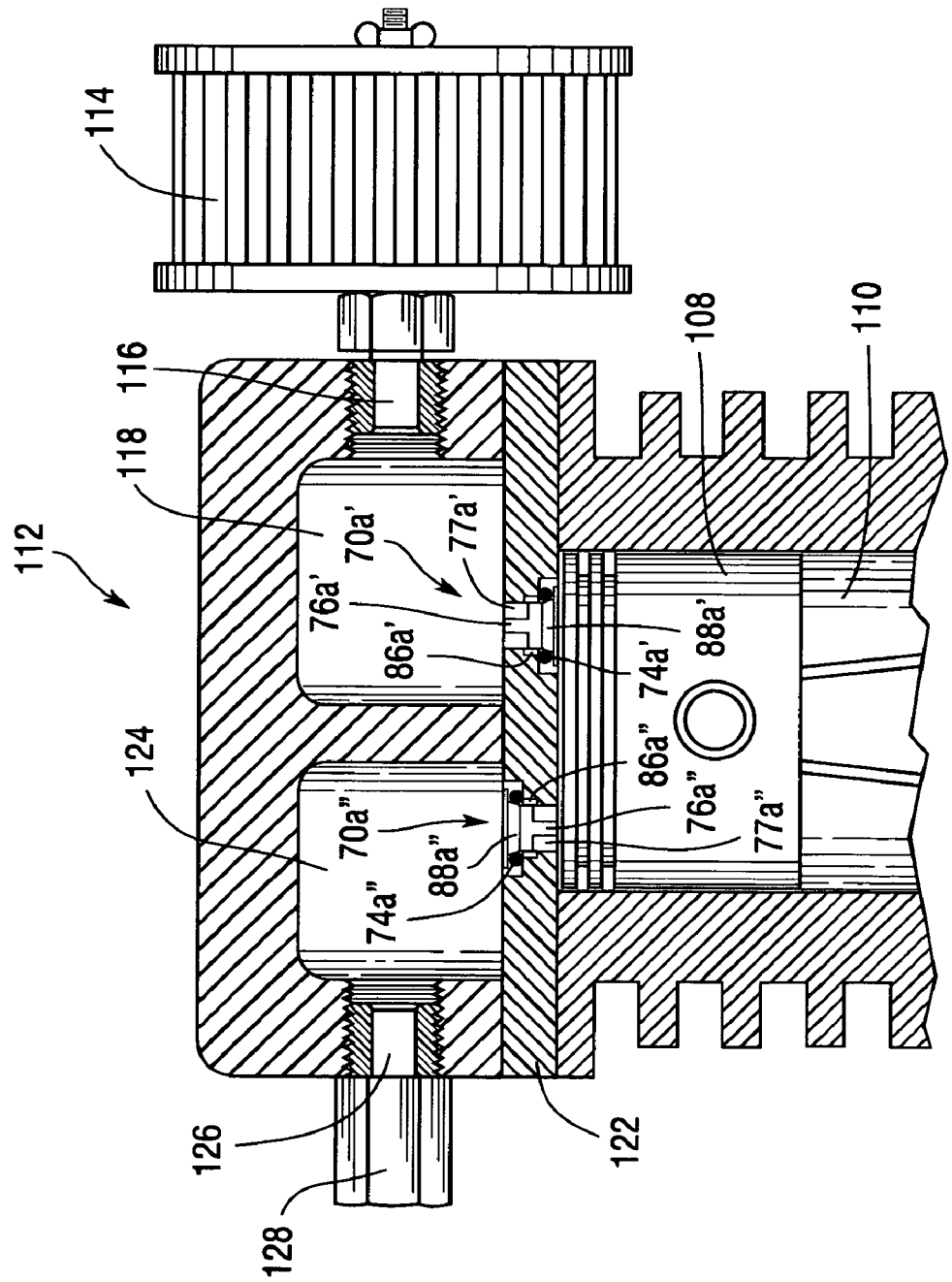
FIG. 8 is a magnified side partial cross sectional view of the compressor pump of the air compressor system of FIG. 6.

FIGS. 6-8 depict an air compressor system 104a incorporating check valves of the invention into various system components. The compressor system 104a includes an electric motor 106 configured to operate a piston 108 that is located within the compression cylinder 110 of a compressor pump 112. A valve plate 122 positioned above the compression cylinder 110 includes an inlet check valve 70a' and an outlet check valve 70a" of the invention and forms the valve body of both valves. Air enters the compressor pump 112 through an inlet filter 114 and inlet port 116 to enter into and create upstream atmospheric air pressure in a cylinder inlet chamber 118. When the piston 108 reciprocates within the compression cylinder 110, the piston 108 makes repeated intake strokes (moving in a downward direction in FIGS. 6 and 8) and compression strokes (moving in an upward direction in FIGS. 6 and 8).

As best understood with reference to FIG. 8, during each intake stroke, the piston 108 creates a vacuum in the compression cylinder 110. This causes a differential in air pressure between the cylinder inlet chamber 118 and compression cylinder 110 that is greater than the cracking pressure of the inlet check valve 70a'. As a result, air from the cylinder inlet chamber 118 flows through the flutes 77a' and pressure chamber 86a' to push the elastomeric seal 74a' along the tapered section 88a' of the plug 76a' which in turn creates a preselected clearance by removing sealing contact between the seal 74a' and valve plate 122, allowing air to enter the compression cylinder 110 through the inlet check valve 70a'. During each intake stroke, air cannot enter through the outlet check valve 70a" from the cylinder outlet chamber 124 since air pressure contained in the cylinder outlet chamber 124 and the spring force of the elastomeric seal 74a" force the seal 74a" into sealing contact with the valve plate 122, preventing the backflow of downstream air into the compression cylinder 110.

During each compression stroke, the piston 108 compresses air previously drawn into the compression cylinder 110 during the preceding intake stroke. This causes a differential in air pressure between the compression cylinder 110 and cylinder outlet chamber 124 that is greater than the cracking pressure of the outlet check valve 70a". As a result, air from the compression cylinder 110 flows through the flutes 77a" and pressure chamber 86a" to force the elastomeric seal 74a" along the tapered section 88a" of the plug 76a" which in turn creates a preselected clearance by removing sealing contact between the seal 74a" and valve plate 122, allowing air to enter the cylinder outlet chamber 124 through the inlet check valve 70a". During each compression stroke, air cannot enter through the inlet check valve 70a' from the cylinder inlet chamber 118 since the compressed air of the compression cylinder 110 and the spring force of the elastomeric seal 74a' force the seal 74a' into sealing contact with the valve plate 122, preventing the flow of air into the compression cylinder 110 from the cylinder inlet chamber 118.

Repeated compression strokes by the piston 108 will lead to pressurization of the air contained within the cylinder outlet chamber 124 and, via the outlet port 126, the discharge tube 128. Referring to FIG. 6, the discharge tube 128 leads to a reservoir check valve 70a''' of the invention which is connected to allow for the flow of compressed air into an air reservoir 130. As best understood by comparing FIG. 6 with the magnified view of the reservoir check valve 70a''' and an unloader valve 132 in FIG. 7, the discharge tube 128 connects to the inlet end 79a''' of the reservoir check valve 70a''' to allow compressed air from the compressor pump 112 to flow through the valve cavity 84a''' toward the outlet end 81a'''. When air pressure in the valve cavity 84a''' exceeds the air pressure within the air reservoir 130 by a pressure differential that results in a force exceeding the cracking force of the check valve 70a''', the elastomeric seal 74a''' moves along the tapered section 88a''' of the plug 76a'''. to remove the elastomeric seal 74a''' from sealing contact with the valve body 72a''' and creates a preselected clearance there between. This allows air to flow from the valve cavity 84a''' through the flutes 77a''' and pressure chamber 86a''' and past the elastomeric seal 74a''' into the air reservoir 130.

Referring to FIG. 6, a pilot valve 134 is mounted on the air reservoir 130 and is responsive the level of air pressure that is present within the air reservoir 130. A pilot valve tube 136 extends from the pilot valve 134 to the unloader valve 132 and allows the pilot valve 134 to transmit a pneumatic pressure signal to the unloader valve 132 which the unloader valve 132 receives from the pilot valve tube 136 through a signal chamber 138.

Referring to FIGS. 6 and 7, consider a situation in which the compressor pump 112 continues to pressurize the air reservoir 130 until the air pressure within the reservoir 130 reaches a preselected maximum level. The pilot valve 134, being responsive to the level of air pressure within the air reservoir 130, detects that the level of air pressure present in the reservoir 130 is at the preselected maximum level and responds by transmitting a pneumatic signal through the pilot valve tube 136. The pneumatic signal is received by the signal chamber 138 of the unloader valve 132, resulting in an increase in the amount of pneumatic pressure present within the signal chamber 138. The increased pressure in the signal chamber 138 results in pneumatic pressure being exerted through a signal aperture 140 to push against a sealing diaphragm 142. The sealing diaphragm 142 in turn pushes against an actuating stem 144 connected to an unloader piston 146 located in an unloader chamber 148.

The unloader valve 132 connects to the check valve 70a''' to link the unloader chamber 148 to the valve cavity 84a''' of the check valve 70a'''. The unloader chamber 148 opens to the valve cavity 84a''' at a location that is upstream of the elastomeric seal 74a''', and extends to a vent 150 that is open to atmosphere. The unloader piston 146 is biased with an unloader spring 152 to a sealing position (shown in FIG. 7) that seals the unloader piston 146 against an unloader seat 154, preventing the flow of air from the valve cavity 84a''' of the check valve 70a''' through the unloader chamber 148 and vent 150 to atmosphere.

When the sealing diaphragm 142 pushes against the actuating stem 144, the stem 144 pushes the unloader piston 146 against the bias of the unloader spring 152, removing the sealing contact of the unloader piston 146 against the unloader seat 154. Therefore, in response to the maximum reservoir air pressure detected by the pilot valve 134, the unseated unloader piston 146 allows air to flow from the valve cavity 84a''' of the check valve 70a''' through the unloader valve 132 to atmosphere. This also causes the pressure differential between the valve cavity 84a''' and air reservoir 130 to drop to such an extent that air pressure in the valve cavity 84a''' can no longer exert a cracking force against the elastomeric seal 74a''' and maintain the seal 74a''' at a location along the tapered section 88a''' of the plug 76a''' that is away from the valve body 72a''', allowing the check valve 70a''' to close under the spring force of the elastomeric seal 74a'''.

The unloader valve 132 continues to allow compressed air from the discharge tube 128 and valve cavity 84a''' to exit to atmosphere until the pilot valve 134 detects that the air pressure contained within the air reservoir 130 has fallen below a preselected minimum level. When such a fall in the level of reservoir air pressure occurs, the pilot valve 134 removes the pneumatic air signal from the pilot valve tube 136, allowing the unloader piston 146 to move under the biasing force of the unloader spring 152 back into sealing contact with the unloader seat 154 and prevent the flow of air through the unloader valve 132 to atmosphere. This in turn allows air pressure in the valve cavity 84a''' of the check valve 70a''' to again rise to a cracking pressure to create a cracking force to move the elastomeric seal 74a''' from contact with the valve body 72a''' and allow for the further pressurization of the air reservoir 130 until the air pressure in the reservoir 130 again reaches the preselected maximum level. This configuration allows the compressor pump 112 to run continuously without exceeding the preselected maximum air pressure in the air reservoir 130.

Figure 5A:
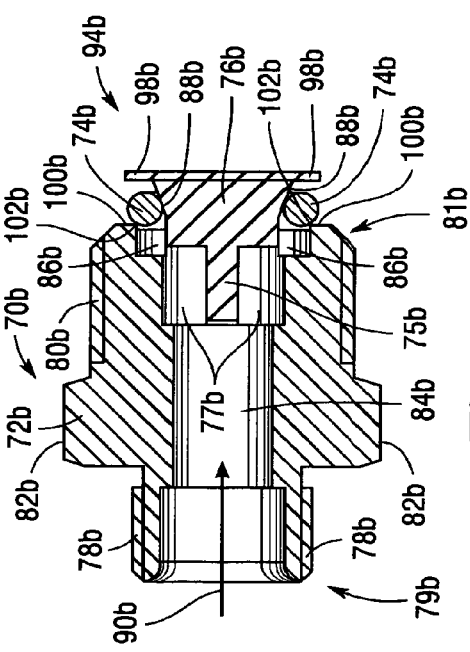
FIG. 5A is a side cross sectional view of a check valve according to one embodiment of the invention having an elastomeric seal in a normal position.

Although the invention has been shown and described with respect to an embodiment in which an elastomeric seal contacts a chamfer or flattened surface of the valve body, it will be appreciated that various types of sealing contact surfaces can be incorporated into a valve body within the scope of the invention, some of which are described below. By way of example, FIG. 5A is a side cross sectional view of a check valve 70b in which the valve body 72b has a face 100b at the outlet end 81b that intersects the pressure chamber 86b at an edge 102b. The elastomeric seal 74b is reciprocally mounted around the tapered section 44b and biased to a normal position in which the seal 74b makes sealing contact with the edge 102b to prevent the flow of air from the pressure chamber 86b through the outlet end 81b of the valve body 72b.

When the elastomeric seal 74b is in this normal position, a portion of the curved outside surface of the seal 74b remains exposed to the pressure chamber 86b. The edge 102b forms a relatively small point for contact with the elastomeric seal 74*b*, increasing the remaining curved outside surface area of the seal 74*b* that remains exposed to the pressure chamber 86*b*. By increasing the outside surface area of the elastomeric seal 74*b* that is exposed to the pressure chamber 86*b*, the edge 102*b* increases the amount of seal surface area that is exposed to air pressure present in the valve cavity 84*b*, reducing the cracking pressure required to initially move the elastomeric seal 74*b* away from the edge 102*b* to create a preselected clearance there between and open the check valve 70*b*. By forming a relatively small point of contact with the elastomeric seal 74*b*, the edge 102*b* also reduces the distance that the seal 74*b* must move in the downstream direction 90*b* along the tapered section 88*b* to lose sealing contact with the edge 102*b* and allow for the flow of air between the pressure chamber 86*b* and outlet end 81*b*, further reducing the cracking pressure of the check valve 70*b*.

It will be further appreciated that some embodiments may allow variations in the configurations of the plug and pressure chamber. FIGS. 9A and 9B depict side cross sectional and front views of a check valve 70*c* having a plug 76*c* that is suspended in position at the outlet end 81*c* of the valve body 72*c* with a restrictor disk 156. The plug 76*c* is shaftless, with the valve assembly 94*c* extending only slightly into the valve cavity 84*c* at the outlet end 81*c* of the check valve 70*c*. This configuration eliminates the need for flutes for the passage of air in the valve cavity 84*c* in the downstream direction 90*a* from the inlet end 79*c* to the pressure chamber 86*c*. Air passages 158 allow air to pass through the valve assembly 94*c* and out the outlet end 81*c* when the elastomeric seal 74*c* moves in the downstream direction 90*a* away from the valve body 72*c* to create a preselected clearance and open the check valve 70*c*. The edge 102*c* of the pressure chamber 86*c* is located upstream of the downstream terminus 162*c* of the valve cavity 84*c*.

In some contemplated embodiments of the invention, in which the elastomeric seal seals against an edge of the pressure chamber in the normal position, the edge may vary in construction, placement, and/or orientation with respect to the valve body or other check valve components. FIGS. 10A and 10B depict side cross sectional views of a check valve 70*d* in which the valve body 72*d* includes a washer insert 160*d* that is compression fit into the valve cavity 84*d* at the outlet end 81*d* to become part of the valve body 72*d*. An exposed, downstream surface of the washer insert 160*d* forms the face 100*d* of the valve body 72*d*. The washer insert 160*d* also forms part of the inside surface of the valve cavity 84*d* in the pressure chamber 86*d*. Referring to FIG. 10B, when the check valve 70*d* is fully open, the preselected valve clearance 96*d* is determined by the clearance that exists between the elastomeric seal 74*d*, as it is positioned against the restrictor 98*d*, and the edge 102*d* of the valve body 72*c* that is created by the washer insert 160*d*. In addition to compression fitting, similar washer inserts can also be connected to the rest of the valve body with threads, adhesives, or other forms of attachment.

Figure 11A:
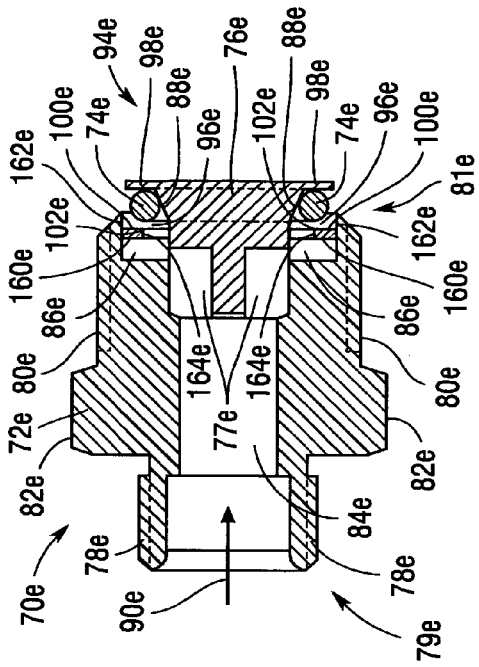
FIG. 11A is a side cross sectional view of a check valve according to one embodiment of the invention having an elastomeric seal in a normal position.
Figure 11B:
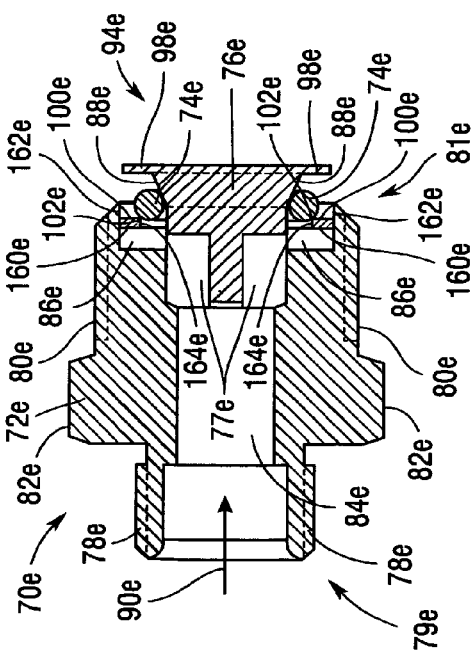
FIG. 11B is a side cross sectional view of the check valve of FIG. 11A depicting a preselected clearance that is a valve clearance between the elastomeric seal and an edge of the valve body.

Such washer inserts can also be positioned within the valve cavity of a check valve to form a flange or similar structure that is part of the valve body extending inwardly into the valve cavity. FIGS. 11A and 11B depict side cross sectional views of such a check valve 70*e* having a washer insert 160*e* that is compression fit to a position that is within the valve cavity 84*e* near the outlet end 81*e* to become part of the valve body 72*e*. Due to this positioning of the washer insert 160*e*, the face 100*e* of the valve 70*e* is formed by a downstream surface of the washer insert 160*e* and is located in a position that is upstream of the downstream terminus 162*e* of the valve cavity 84*e*. The washer insert 160*e* also forms an inside surface 164*e* of the valve cavity 84*e* that intersects the face 100*e* to create an edge 102*e* against which the elastomeric seal 74*e* can seal when in the normal position (as shown in FIG. 11A). The pressure chamber 86*e* is located in a position that is immediately upstream of the washer insert 160*e*.

Figure 12A:
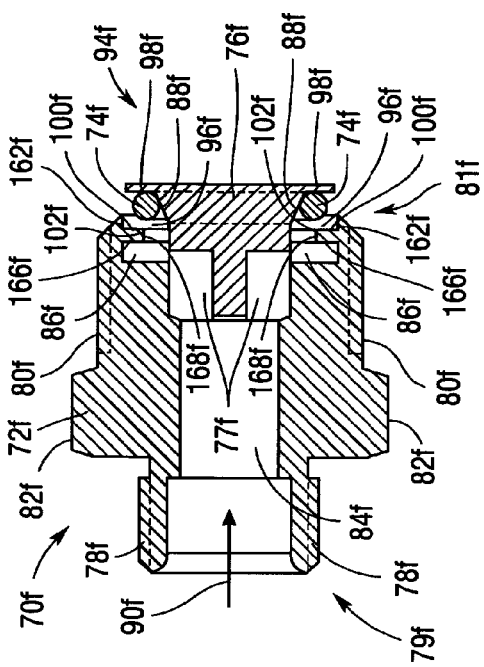
FIG. 12A is a side cross sectional view of a check valve according to one embodiment of the invention having an elastomeric seal in a normal position.
Figure 12B:
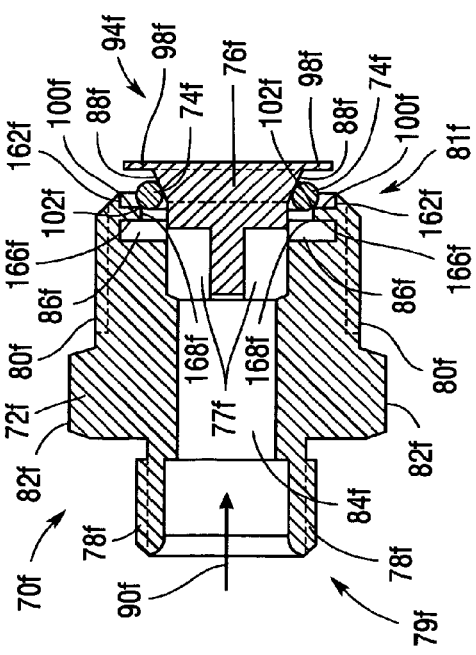
FIG. 12B is a side cross sectional view of the check valve of FIG. 12A depicting a preselected clearance that is a valve clearance between the elastomeric seal and an edge of the valve body.

Rather than including a separate washer insert or other assembly, the valve body can also include a flange extension or other inwardly extending formation that is formed directly from the valve body material itself. FIGS. 12A and 12B depict a check valve 70*f* having a flange extension 166 that extends inwardly into the valve cavity 84*f* from the valve body 72*f*. The flange extension 166 is machined, cast, or otherwise formed from the material of the valve body 72*f* and is located near the outlet end 81*f*. Due to this positioning of the flange extension 166, the face 100*f* of the valve 70*f* is formed by a downstream surface of the flange extension 166 and is located in a position that is upstream of the downstream terminus 162*f* of the valve cavity 84*f*. The flange extension 166 also forms an inside surface 168 of the valve cavity 84*f* that intersects the face 100*f* to create an edge 102*f* against which the elastomeric seal 74*f* can seal when in the normal position (as shown in FIG. 12A). The pressure chamber 86*f* is located in a position that is immediately upstream of the flange extension 166.

Some contemplated embodiments may also include tapered sections divided into segments having different incident angles. For example, FIGS. 13A-C depict a check valve outlet end 81*g* in which the valve assembly 94*g* is constructed around a plug 76*g* having a tapered section divided into a first tapered segment 170*g* and an adjacent second tapered segment 172*g*. The included angle of the second tapered segment 172*g* is shallower than the included angle of the first tapered segment 170*g*. However, the diameter of the second tapered segment 172*g* is greater than the diameter of the first tapered segment 170*g*.

This difference between the included angles and diameters of the first and second tapered segments 170*g* and 172*g* enables the valve assembly 94*g* to allow for an increased airflow capacity during operation. Consider the valve assembly 94*g* prior to operation when the elastomeric seal 74*g* is in the normal position as depicted in FIG. 13A. The elastomeric seal 74*g* remains in contact with the edge 102*g* at the face 100*g* to close the valve assembly 94*g* and prevent air flow through the outlet end 81*g*. At this position, the seal 74*g* contacts the first tapered segment 170*g* but does not contact the second tapered segment 172*g* of the plug 76*g*. The seal 74*g* remains in this position until a cracking pressure is introduced in the pressure chamber 86*g*. To initially open the valve assembly 94*g*, the cracking pressure must be sufficiently large to exert a sufficient amount of force against the seal 74*g*, acting on the limited surface areas of the seal 74*g* exposed to the pressure chamber 86*g*, to move the seal 74*g* away from the valve face 100*g* and against the frictional forces encountered against the steeper included angle of the first tapered segment 170*g*. A sufficient amount of total force exerted must also continue to be present to move the seal 74*g* against the included angle of the first tapered segment 170*g* until the seal 74*g* moves to the position shown in FIG. 13B. However, since the diameter of the first tapered segment 170*g* is less than the diameter of the second tapered segment 170*g*, inward radial forces exerted by the seal 74*g* are relatively low. As the valve assembly 94*g* opens, more surface area of the seal 74*g* becomes exposed to the air pressure from the pressure chamber 86*g*, increasing the total force exerted against the seal 74*g*.

Referring now to FIG. 13B, once the elastomeric seal 74*g* reaches the second tapered segment 172*g*, the increased diameter of the second tapered segment 172*g* results in increased inward radial forces being exerted by the seal 74*g* as it increasingly stretches. Frictional forces between the seal 74g and second tapered segment 172g also increase as the seal 74g stretches further. Thus, as the diameter of the second tapered segment 172g increases, it becomes increasingly important to keep additional stretching of the seal 74g to a minimum.

The shallower included angle of the second tapered segment 172g allows for a reduction in such stretching. As the seal 74g moves along the second tapered segment 172g toward the fully open preselected valve position depicted in FIG. 13C, the increased inward radial forces exerted by the seal 74g are less than they would be if the included angle of second tapered segment 172g were as steep as the first tapered segment 170g. Thus, the overall amount of force required to move the seal 74g to points along the second tapered segment 172g is reduced. For many operating conditions, and particularly those conditions in which there is sufficient pressure and force to move the seal 74g to the second tapered segment 170g, this tends to displace the seal 74g a greater distance from the valve face 100g for a given pressure, allowing a larger volume of air to flow through the valve assembly 94g at the given pressure.

Figure 14A:
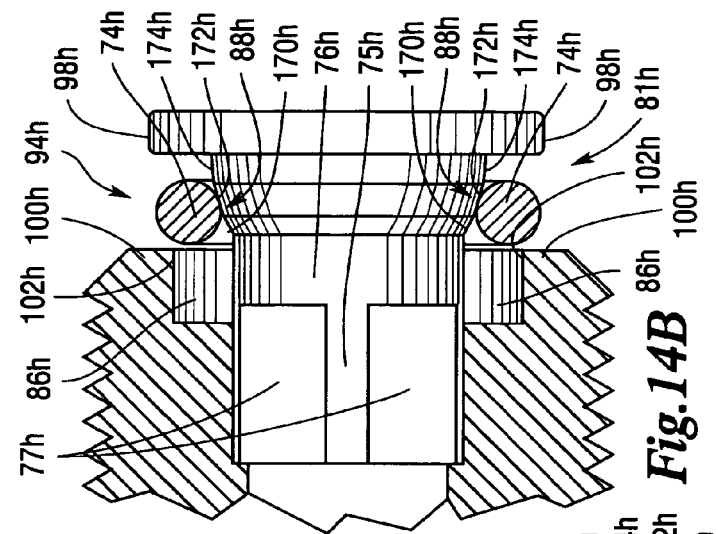
FIG. 14A is a side cross sectional view of an outlet end of a check valve according to one embodiment of the invention having an elastomeric seal in a normal position.
Figure 14B:
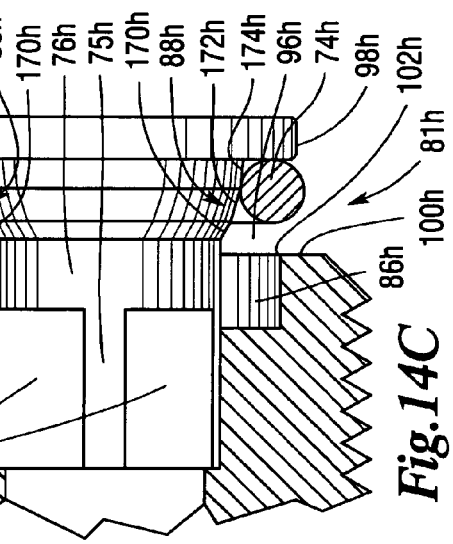
FIG. 14B is a side cross sectional view of the check valve of FIG. 14A depicting a preselected clearance between the elastomeric seal and an edge of the valve body.
Figure 14C:
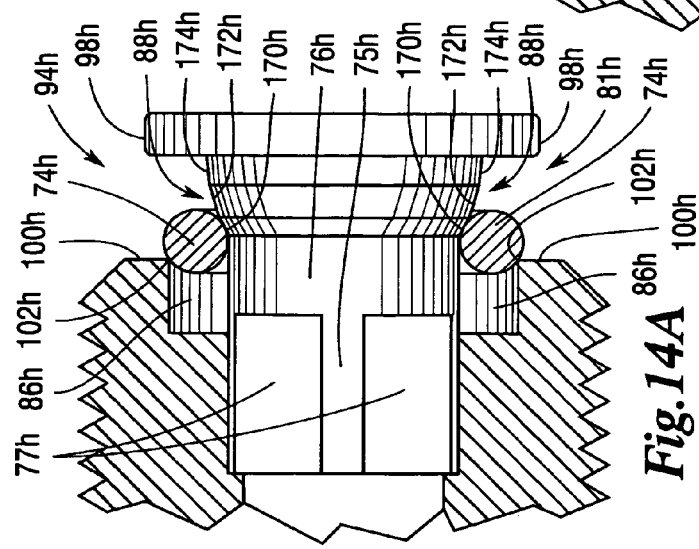
FIG. 14C is a side cross sectional view of the check valve of FIG. 14A depicting a preselected clearance that is a valve clearance between the elastomeric seal and an edge of the valve body.

It will be appreciated that any number of tapered sections or tapered segments can be included within the contemplated scope of the invention, and it is further contemplated that different tapered segments can share or have different included angles. For example, FIGS. 14A-C depict a check valve outlet end 81h of the invention in which the valve assembly 94h includes a tapered section 88h having a third tapered segment 174h that has an included angle that is shallower than the included angles of either the first tapered segment 170h or second tapered segment 172h. Due to the shallower included angle of the second tapered segment 172h, after the seal 74h moves along the first tapered segment 170h, as depicted in FIG. 14A, less force is required to move the seal 74h along points of the second tapered segment 172h, as depicted in FIG. 14B, than would be required if the second tapered segment 172h had the included angle of the first tapered segment 170h. Due to the even shallower included angle of the third tapered segment 174h, after the seal 74h moves along the second tapered segment 172h, less force is required to move the seal 74h along points of the third tapered segment 174h than would be required if the third tapered segment 172h had the included angles of either the first tapered segment 170h or second tapered segment 172h.

Figure 15B:
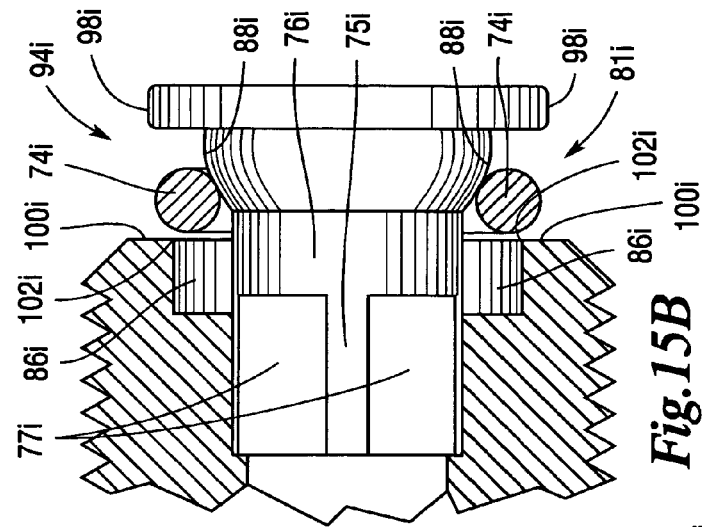
FIG. 15B is a side cross sectional view of the check valve of FIG. 15A depicting a preselected clearance between the elastomeric seal and an edge of the valve body.
Figure 15C:
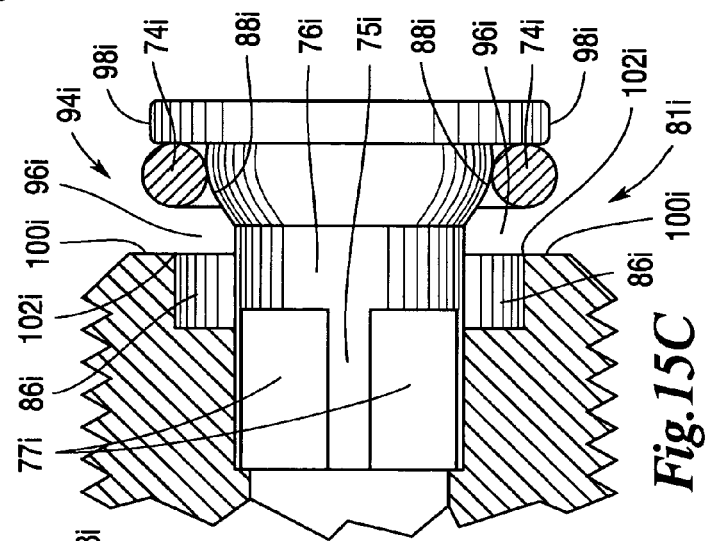
FIG. 15C is a side cross sectional view of the check valve of FIG. 15A depicting a preselected clearance that is a valve clearance between the elastomeric seal and an edge of the valve body.
Figure 15A:
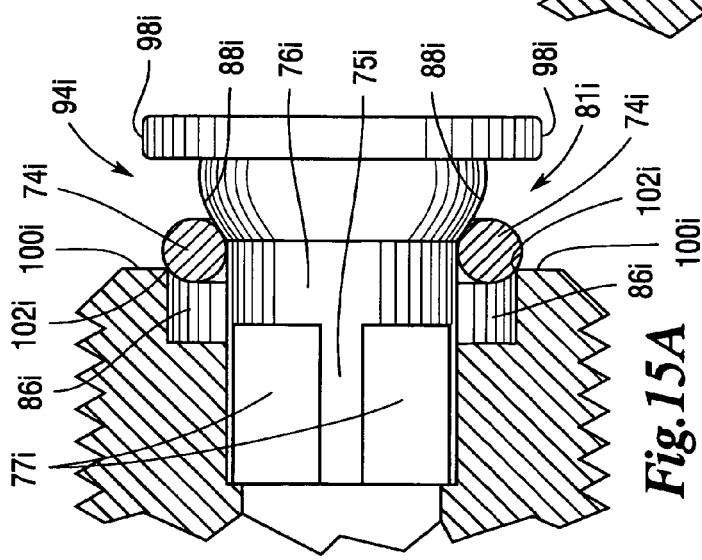
FIG. 15A is a side cross sectional view of an outlet end of a check valve according to one embodiment of the invention having an elastomeric seal in a normal position.

It will be further appreciated that tapered sections that are curved or that are otherwise shaped to have a non-constant incident angle can also be incorporated within the contemplated scope of the invention. For example, FIGS. 15A-C depict a check valve outlet end 81i of the invention that includes a valve assembly 94i having a curved tapered section 88i with a diameter that becomes increasingly wider but which has a curved slope that is increasingly shallow in a direction that is away from the valve face 100i. The curved shape of the cross sectional slope of the tapered section 88i can allow for increased flow capacity by the valve assembly 94i under some operating conditions.

Consider the valve assembly 94I prior to operation when the elastomeric seal 74i is in the normal position as depicted in FIG. 15A. The elastomeric seal 74I remains in contact with the edge 102I at the face 100i to close the valve assembly 94i and to prevent airflow through the outlet end 81i. At this position, the seal 74i contacts the curved tapered section 88i at a position where the tapered section 88i has a relatively steep slope. The seal 74i remains in this position until a cracking pressure is introduced in the pressure chamber 86i. To initially open the valve assembly 94i, the cracking pressure must be sufficiently large to exert a sufficient amount of force against the seal 74i, acting on the limited surface areas of the seal 74i exposed to the pressure chamber 86i, to move the seal 74i away from the valve face 100i and against the frictional forces encountered as the seal 74i moves along the tapered section 88i. However, since the diameter of the tapered section 88i is smaller near the pressure chamber 86i, inward radial forces exerted by the seal 74i are relatively low. As the valve assembly 94i opens, more surface area of the seal 74i becomes exposed to the air pressure from the pressure chamber 86i, increasing the total force exerted against the seal 74i.

Referring now to FIG. 15B, once the elastomeric seal 74g moves away from the edge 102i, the increased diameter of the tapered section 88i causes the seal 74i to stretch, resulting in increased inward radial forces being exerted by the seal 74i. Frictional forces between the seal 74i and tapered section 88i also increase as the seal 74i stretches further. Thus, as the seal 74i moves further along the tapered section 88i and away from the valve face 100i, it becomes increasingly important to keep additional stretching of the seal 74g to a minimum.

The curved cross sectional shape of the tapered section 88i, in which the slope of the tapered section 88i becomes increasingly shallower in a direction away from the valve face 100i, allows for a reduction in such stretching. As the seal 74i moves along the tapered section 88i toward the fully open preselected valve position depicted in FIG. 15C, the increased inward radial forces exerted by the seal 74i are less than they would be if the slope of the tapered section 88i was the same near the restrictor 98i as it is near the pressure chamber 86i. Thus, the overall amount of force required to move the seal 74i to points along the tapered section 88i is reduced. This tends to displace the seal 74i a greater distance from the valve face 100i for a given pressure, allowing a larger volume of air to flow through the valve assembly 94i at the given pressure.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed:

1. A check valve for use in an air compressor system that includes an air compressor having a compression cylinder, comprising:

a valve body having an inlet end through which air enters said check valve and an outlet end through which air exits said check valve, and a valve cavity within said valve body extending between about said inlet end and about said outlet end;

a valve assembly located at a position with respect to said valve cavity which enables said valve assembly to control the flow of air through said valve cavity, said valve assembly including a plug having at least a tapered section, said tapered section having a cross section that increases in diameter in a direction that is downstream from said inlet end;

said valve assembly having an elastomeric seal that is mounted around said tapered section to reciprocate on said tapered section, said tapered section biasing said elastomeric seal to a normal position in sealing contact with said valve body and said tapered section to prevent air from flowing downstream from said inlet end and out said outlet end;

said valve assembly allowing air to flow downstream from said inlet and out said outlet end of said valve body when the air compressor produces an amount of air pressure necessary to create a force against said elastomeric seal that is sufficient to cause said seal to be located at a position away from said valve body along said tapered section and to create a preselected clearance between said valve body and said seal; and the portion of said valve cavity, between about said inlet end and about the location where said elastomeric seal contacts said valve body, having a minimum cross sectional area that allows the pressure of the air flowing through said preselected clearance to be sufficient to continuously remove air from said valve cavity to prevent substantial accumulation of back pressure produced by the air compressor upstream of said valve when repeated cycles of the compression cylinder of said air compressor repeatedly cause said seal to be located at a position away from said valve body and create the preselected clearance between said valve body and said seal.

2. The check valve of claim 1 further comprising an edge at about said outlet end of said valve body wherein said elastomeric seal is biased to contact said valve body at said edge when said elastomeric seal is in the normal position.

3. The check valve of claim 1 further comprising an edge at about said outlet end of said valve body, said edge being formed from a flange extending inwardly from said valve cavity, wherein said elastomeric seal is biased to contact said body at said edge when said elastomeric seal is in the normal position.

4. The check valve of claim 1 further comprising an edge at about said outlet end of said valve body, said edge being formed from a flange that is a circular washer which is compression fit to be part of said valve body and which extends inwardly into said valve cavity wherein said elastomeric seal is biased to contact said body at said edge when in the normal position.

5. The check valve of claim 1 wherein said plug further comprises a shaft that includes four separate air passages through which air can flow downstream from said inlet end of said valve body through said valve cavity to said outlet end.

6. The check valve of claim 1 further comprising a pressure chamber that is the portion of said valve cavity that is located upstream of and about adjacent said elastomeric seal.

7. The check valve of claim 1 wherein said preselected clearance between said elastomeric seal and said outlet end is sufficiently large to allow a process flow of air from said inlet end through said outlet end of said valve body when the air compressor produces a clearance pressure.

8. The check valve of claim 1 wherein said tapered section includes a restrictor to restrict further movement of said elastomeric seal in a direction that is downstream and away from said inlet end of said valve body when said elastomeric seal is separated from said valve body by a preselected valve clearance therebetween.

9. The check valve of claim 1 wherein said elastomeric seal includes an outside surface area, said elastomeric seal being positioned to allow more of said outside surface area to be exposed to air pressure produced by the air compressor when said elastomeric seal is not in the normal position and in sealing contact with said valve body than when said elastomeric seal is in the normal position and in sealing contact with said valve body.

10. The cheek valve of claim 1 wherein said valve body includes an inside chamfer in said valve cavity, said valve cavity having a diameter at said chamfer that increases in size in a downstream direction, said elastomeric seal being biased to contact said valve body at said chamfer when said elastomeric seal is in the normal position.

11. The check valve of claim 1 wherein said plug extends across the diameter of said valve cavity at about said outlet end of said valve body, said plug having at least an air passage to allow for air to pass therethrough.

12. The check valve of claim 1 wherein said tapered section includes at least a first tapered segment and at least a second tapered segment, said first tapered segment having an incident angle that is different from an incident angle of said second tapered segment.

13. The check valve of claim 1 wherein said tapered section includes at least a first tapered segment and at least a second tapered segment said second tapered segment having an incident angle that is shallower than an incident angle of said first tapered segment.

14. The check valve of claim 1 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

15. The check valve of claim 1 wherein said tapered section includes at least a first tapered segment, a second tapered segment, and a third tapered segment, said second tapered segment having an incident angle that is shallower than an incident angle of said first tapered segment said third tapered section having an incident angle that is shallower than said incident angle of said second tapered section.

16. The check valve of claim 1 wherein said tapered section has a curved cross sectional shape.

17. The check valve of claim 1 wherein said tapered section has a curved cross sectional shape at which the slope of said tapered section becomes increasingly shallower in a direction that is downstream of said inlet end and in which a diameter of said tapered section becomes increasingly wider in a direction that is downstream of said inlet end.

18. A check valve for use between an air compressor and an air receiver that stores air, said check valve comprising:

a valve body having an inlet end connectable to the air compressor and an outlet end connectable to the air receiver, a face of said valve body at about said outlet end, and a valve cavity within said valve body extending between said inlet end and said outlet end;

a valve pressure chamber in said valve cavity located at about said outlet end of said valve body;

a valve assembly located at a position with respect to said valve cavity which enables said valve assembly to control the flow of air through said valve cavity, said valve assembly having a plug having at least a tapered section that increases in diameter in a direction that extends away from said inlet end;

an edge of said pressure chamber located where an inside surface of said pressure chamber intersects said face at about said outlet end of said valve body; and said valve assembly including an elastomeric seal that is mounted around said tapered section to reciprocate on said tapered section, said tapered section biasing said elastomeric seal to a normal position in sealing contact with said edge of said pressure chamber and said tapered section to prevent air from flowing downstream from said inlet end of said valve body through said valve cavity and out said outlet end, said elastomeric seal being movable on said tapered section away from sealing contact with said edge of said pressure chamber in response to a cracking pressure produced within said pressure chamber.

19. The check valve of claim 18 further comprising a restrictor on said tapered section to restrict further movement of said elastomeric seal in a direction that is away from said inlet end of said valve body when a preselected maximum clearance exists between said elastomeric seal and said edge of said pressure chamber.

20. The check valve of claim 18 wherein the air compressor is capable of producing at least a clearance pressure, that is greater than said cracking pressure, to move said elastomeric seal a distance away from the normal position to cause a preselected clearance between said elastomeric seal and said edge of said pressure chamber, the amount of air flowing from said inlet end out said outlet end of said valve body when said preselected clearance exists between said elastomeric seal and said edge remains continuous when the compressor produces the clearance pressure.

21. The check valve of claim 18 wherein said elastomeric seal includes an outside surface area, said elastomeric seal being positioned to allow more of said outside surface area to be exposed to air pressure produced by the air compressor when said elastomeric seal is not in the normal position and in sealing contact with said edge of said pressure chamber than when said elastomeric seal is in the normal position and in sealing contact with said edge of said pressure chamber.

22. The check valve of claim 18 wherein said plug extends across the diameter of said valve cavity at about said outlet end of said valve body, said plug having at least an air passage to allow for air to pass therethrough.

23. The check valve of claim 18 further comprising a washer insert at about the outlet end of said valve body, said washer insert forming said face of said valve body, said washer insert also forming at least part of said pressure chamber and said edge.

24. The check valve of claim 18 further comprising a flange extension at about the outlet end of said valve body, said flange extension also forming at least part of said pressure chamber and said edge.

25. The check valve of claim 18 wherein said valve body includes an inside chamfer in said valve cavity, said valve cavity having a diameter at said chamfer that increases in size in a downstream direction, said elastomeric seal being biased to contact said valve body at said chamfer when said elastomeric seal is in the normal position.

26. The check valve of claim 18 wherein said tapered section includes at least a first tapered segment and at least a second tapered segment, said first tapered segment having an incident angle that is different from an incident angle of said second tapered segment.

27. The check valve of claim 18 wherein said tapered section includes at least a first tapered segment and at least a second tapered segment, said second tapered segment having an incident angle that is shallower than an incident angle of said first tapered segment.

28. The check valve of claim 18 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

29. The check valve of claim 18 wherein said tapered section includes at least a first tapered segment, a second tapered segment, and a third tapered segment, said second tapered segment having an incident angle that is shallower than an incident angle of said first tapered segment, said third tapered section having an incident angle that is shallower than said incident angle of said second tapered section.

30. The check valve of claim 18 wherein said tapered section has a curved cross sectional shape.

31. The check valve of claim 18 wherein said tapered section has a curved cross sectional shape at which the slope of said tapered section becomes increasingly shallower in a direction that is downstream of said inlet end and in which a diameter of said tapered section becomes increasingly wider in a direction that is downstream of said inlet end.

32. A check valve for use between an air compressor and an air receiver that stores air, said check valve comprising:
   a valve body having an inlet end connectable to the air compressor and an outlet end connectable to the air receiver, and a valve cavity within said valve body extending between said inlet end and said outlet end;
   a valve pressure chamber located in said valve cavity at about said outlet end of said valve body;
   a valve assembly mounted at a position with respect to said valve cavity which enables said valve assembly to control the flow of air through said valve cavity, said valve assembly having a plug having at least a tapered section that increases in diameter in a direction that extends away from said inlet end;
   an edge of said pressure chamber located at about said outlet end of said valve cavity; and
   said valve assembly including an elastomeric seal that is mounted around said tapered section to reciprocate on said tapered section, said tapered section biasing said elastomeric seal to a normal position in sealing contact with said edge of said pressure chamber and said tapered section to prevent air from flowing downstream from said inlet end of said valve body through said valve cavity and out said outlet end, said elastomeric seal being movable on said tapered section away from sealing contact with said edge of said pressure chamber in response to a cracking pressure produced within said pressure chamber.

33. The check valve of claim 32 further comprising a restrictor on said tapered section to restrict further movement of said elastomeric seal in a direction that is away from said inlet end of said valve body when a preselected maximum clearance exists between said elastomeric seal and said edge of said pressure chamber.

34. The check valve of claim 32 wherein the air compressor is capable of producing at least a clearance pressure, that is greater than said cracking pressure, to move said elastomeric seal a distance away from the normal position to cause a preselected clearance between said elastomeric seal and said edge of said pressure chamber, the amount of air flowing from said inlet end out said outlet end of said valve body when said preselected clearance exists between said elastomeric seal and said edge remains continuous when the compressor produces the clearance pressure.

35. The check valve of claim 32 wherein said elastomeric seal includes an outside surface area, said elastomeric seal being positioned to allow more of said outside surface area to be exposed to air pressure produced by the air compressor when said elastomeric seal is not in the normal position and in sealing contact with said edge of said pressure chamber than when said elastomeric seal is in the normal position and in sealing contact with said edge of said pressure chamber.

36. The check valve of claim 32 wherein said plug extends across the diameter of said valve cavity at about said outlet end of said valve body, said plug having at least an air passage to allow for air to pass therethrough.

37. The check valve of claim 32 further comprising a washer insert at about the outlet end of said valve body, said washer insert forming said face of said valve body, said washer insert also forming at least part of said pressure chamber and said edge.

38. The check valve of claim 32 further comprising a flange extension at about the outlet end of said valve body, said flange extension also forming at least part of said pressure chamber and said edge.

39. The check valve of claim 32 wherein said valve body includes an inside chamfer in said valve cavity, said valve cavity having a diameter at said chamfer that increases in size in a downstream direction, said elastomeric seal being biased to contact said valve body at said chamfer when said elastomeric seal is in the normal position.

40. The check valve of claim 32 wherein said tapered section includes at least a first tapered segment and at least a second tapered segment, said first tapered segment having an incident angle that is different from an incident angle of said second tapered segment.

41. The check valve of claim 32 wherein said tapered section includes at least a first tapered segment and at least a second tapered segment, said second tapered segment having an incident angle that is shallower than an incident angle of said first tapered segment.

42. The check valve of claim 32 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

43. The check valve of claim 32 wherein said tapered section includes at least a first tapered segment, a second tapered segment, and a third tapered segment, said second tapered segment having an incident angle that is shallower than an incident angle of said first tapered segment, said third tapered section having an incident angle that is shallower than said incident angle of said second tapered section.

44. The check valve of claim 32 wherein said tapered section has a curved cross sectional shape.

45. The check valve of claim 32 wherein said tapered section has a curved cross sectional shape at which the slope of said tapered section becomes increasingly shallower in a direction that is downstream of said inlet end and in which a diameter of said tapered section becomes increasingly wider in a direction that is downstream of said inlet end.

46. A check valve for use in an air compressor comprising:
a valve body having an inlet end through which air enters said check valve, an outlet end through which air exits said check valve, a valve cavity within said valve body extending between about said inlet end and about said outlet end, and an inside chamfer in said valve cavity, said chamfer having a cross section that increases in diameter in a direction that is downstream from said inlet end of said valve body;
a valve assembly located at a position with respect to said valve cavity which enables said valve assembly to control the flow of air through said valve cavity, said valve assembly including a plug having at least a tapered section, said tapered section having a cross section that increases in diameter in a direction that is downstream from said inlet end;
said valve assembly having an elastomeric seal that is mounted around said tapered section to reciprocate on said tapered section, said tapered section biasing said elastomeric seal to a normal position in sealing contact with said inside chamfer of said valve body and said tapered section to prevent air from flowing downstream from said inlet end out said outlet end;
said valve assembly allowing air to flow downstream from said inlet and out said outlet end of said valve body when the air compressor produces an amount of air pressure necessary to create a force against said elastomeric seal that is sufficient to cause said seal to be located at a position away from said valve body along said tapered section and to create a preselected clearance between said valve body and said seal;
the portion of said valve cavity, between about said inlet end and about the location where said elastomeric seal contacts said chamfer, having a minimum cross sectional area that allows the pressure of air flowing through the preselected clearance to be sufficient to continuously remove air from said valve cavity to prevent substantial accumulation of back pressure produced by the air compressor upstream of said valve when repeated cycles of the compression cylinder of said air compressor repeatedly cause said seal to be located at a position away from the valve body and create a preselected clearance between said valve body and said seal.

47. The check valve of claim 46 wherein said valve assembly further comprises a shaft that includes four separate air passages through which air can flow downstream from said inlet end of said valve body through said valve cavity to said outlet end.

48. The check valve of claim 46 further comprising a pressure chamber that is the portion of said valve cavity that is located upstream of and about adjacent said elastomeric seal.

49. The check valve of claim 46 wherein said preselected clearance between said elastomeric seal and said chamfer is sufficiently large to allow a process flow of air from said inlet end through said outlet end of said valve body when the air compressor produces a clearance pressure.

50. The check valve of claim 46 wherein said tapered section includes a restrictor to restrict further movement of said elastomeric seal in a direction that is downstream and away from said inlet end of said valve body when said elastomeric seal is separated from said chamfer by a preselected valve clearance therebetween.

51. The check valve of claim 46 wherein said elastomeric seal includes an outside surface area, said elastomeric seal being positioned to allow more of said outside surface area to be exposed to air pressure produced by the air compressor when said elastomeric seal is not in the normal position and in sealing contact with said chamfer than when said elastomeric seal is in the normal position and in sealing contact with said chamfer.

52. The check valve of claim 46 wherein said plug extends across the diameter of said valve cavity at about said outlet and of said valve body, said plug having at least an air passage to allow for air to pass therethrough.

53. The check valve of claim 46 wherein said tapered section includes at least a first tapered segment and at least a second tapered segment, said first tapered segment having an incident angle that is different from an incident angle of said second tapered segment.

54. The check valve of claim 46 wherein said tapered section includes at least a first tapered segment and at least a second tapered segment, said second tapered segment having an incident angle that is shallower than an incident angle of said first tapered segment.

55. The check valve of claim 46 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

56. The check valve of claim 46 wherein said tapered section includes at least a first tapered segment, a second tapered segment, and a third tapered segment, said second tapered segment having an incident angle that is shallower than an incident angle of said first tapered segment, said third tapered section having an incident angle that is shallower than said incident angle of said second tapered section.

57. The check valve of claim 46 wherein said tapered section has a curved cross sectional shape.

58. The check valve of claim 46 wherein said tapered section has a curved cross sectional shape at which the slope of said tapered section becomes increasingly shallower in a direction that is downstream of said inlet end and in which a diameter of said tapered section becomes increasingly wider in a direction that is downstream of said inlet end.

59. A check valve for use in an air compressor system that includes an air compressor having a compression cylinder, comprising:
a valve body having an inlet end through which air enters said check valve and an outlet end through which air exits said check valve, and a valve cavity within said valve body extending between about said inlet end and about said outlet end;
a valve assembly located at a position with respect to said valve cavity which enables said valve assembly to control the flow of air through said valve cavity, said valve assembly including a plug having at least a tapered section and a shaft, said plug extending across the diameter of said valve cavity at about said outlet end of said valve body, said tapered section having a cross section that increases in diameter in a direction that is downstream from said inlet end, said shaft including four separate air passages through which air can flow downstream from said inlet end of said valve body toward said outlet end;
said valve assembly having an elastomeric seal that is mounted around said tapered section to reciprocate on said tapered section, said tapered section biasing said elastomeric seal to a normal position in sealing contact with said valve body and said tapered section to prevent air from flowing downstream from said inlet end and out said outlet end;
said valve assembly allowing air to flow downstream from said inlet and out said outlet end of said valve body when the air compressor produces an amount of air pressure necessary to create a force against said elastomeric seal that is sufficient to cause said seal to be located at a position away from said valve body along said tapered section and to create a preselected clearance between said valve body and said seal;
a pressure chamber that is the portion of said valve cavity that is located upstream of and about adjacent said elastomeric seal;
said elastomeric seal having an outside surface area, said seal being positioned to allow more of said outside surface area to be exposed to air pressure produced by the air compressor when said elastomeric seal is not in the normal position and in sealing contact with said valve body than when said elastomeric seal is in the normal position and in sealing contact with said valve body; said tapered section including a restrictor to restrict further movement of said elastomeric seal in a direction that is downstream and away from said inlet end of said valve body when said elastomeric seal is separated from said valve body by a preselected valve clearance; and
the portion of said valve cavity, between about said inlet end and about the location where said elastomeric seal contacts said valve body, having a minimum cross sectional area that allows the pressure of air flowing through the preselected clearance to be sufficient to continuously remove air from said valve cavity to prevent substantial accumulation of back pressure produced by the air compressor upstream of said valve when repeated cycles of the compression cylinder of said air compressor repeatedly cause said seal to be located at a position away from the valve body and create a preselected clearance between said valve body and said seal.

60. The check valve of claim 59 wherein said tapered section includes at least a first tapered segment and at least a second tapered segment, said first tapered segment having an incident angle that is different from an incident angle of said second tapered segment.

61. The check valve of claim 59 wherein said tapered section includes at least a first tapered segment and at least a second tapered segment, said second tapered segment having an incident angle that is shallower than an incident angle of said first tapered segment.

62. The check valve of claim 59 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

63. The check valve of claim 59 wherein said tapered section includes at least a first tapered segment, a second tapered segment, and a third tapered segment, said second tapered segment having an incident angle that is shallower than an incident angle of said first tapered segment, said third tapered section having an incident angle that is shallower than said incident angle of said second tapered section.

64. The check valve of claim 59 wherein said tapered section has a curved cross sectional shape.

65. A check valve for use between an air compressor and an air receiver that stores air, said check valve comprising:
a valve body having an inlet end connectable to the air compressor and an outlet end connectable to the air receiver, a face of said valve body at about said outlet end, and a valve cavity within said valve body extending between said inlet end and said outlet end;
a valve pressure chamber located in said valve cavity at about the outlet end of said valve body;
a valve assembly mounted at a position with respect to said valve cavity which enables said valve assembly to control the flow of air through said valve cavity, said valve assembly having a plug having at least a tapered section that increases in diameter in a direction that extends away from said inlet end, said plug extending across the diameter of said valve cavity at about said outlet end of said valve body and having at least an air passage to allow for air to pass therethrough;
an edge of said pressure chamber located where an inside surface of said pressure chamber intersects said face at about the outlet end of said valve body;
said valve assembly including an elastomeric seal that is mounted around said tapered section to reciprocate on said tapered section, said tapered section biasing said elastomeric seal to a normal position in sealing contact with said edge of said pressure chamber and said tapered section to prevent air from flowing downstream from said inlet end of said valve body through said valve cavity and out said outlet end, said elastomeric seal being movable on said tapered section away from sealing contact with said edge of said pressure chamber in response to a cracking pressure produced within said pressure chamber;

the amount of air flowing from said inlet end out said outlet end of said valve body remains continuous when the compressor produces the clearance pressure and a preselected valve clearance exists between said elastomeric seal and said edge; and said tapered section having a restrictor to restrict further movement of said elastomeric seal in a direction that is away from said inlet end of said valve body when a preselected valve clearance exists between said elastomeric seal and said edge of said pressure chamber.

66. The check valve of claim 65 further comprising a washer insert at about the outlet end of said valve body, said washer insert forming said face of said valve body, said washer insert also forming at least part of said pressure chamber and said edge.

67. The check valve of claim 65 further comprising a flange extension at about the outlet end of said valve body, said flange extension also forming at least part of said pressure chamber and said edge.

68. The check valve of claim 65 wherein said tapered section includes at least a first tapered segment and at least a second tapered segment, said first tapered segment having an incident angle that is different from an incident angle of said second tapered segment.

69. The check valve of claim 65 wherein said tapered section includes at least a first tapered segment and at least a second tapered segment said second tapered segment having an incident angle that is shallower than an incident angle of said first tapered segment.

70. The check valve of claim 65 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

71. The check valve of claim 65 wherein said tapered section includes at least a first tapered segment, a second tapered segment and a third tapered segment, said second tapered segment having an incident angle that is shallower than an incident angle of said first tapered segment, said third tapered section having an incident angle that is shallower than said incident angle of said second tapered section.

72. The check valve of claim 65 wherein said tapered section has a curved cross sectional shape.

73. A check valve for use in an air compressor comprising:
a valve body having an inlet end through which air enters said check valve, an outlet end though which air exits said check valve, a valve cavity within said valve body extending between about said inlet end and about said outlet end, and an inside chamfer in said valve cavity, said chamfer having a cross section that increases in diameter in a direction that is downstream from said inlet end of said valve body;
a valve assembly located at a position with respect to said valve cavity which enables said valve assembly to control the flow of air through said valve cavity, said valve assembly including a plug having at least a tapered section, and a shaft, said plug extending across the diameter of said valve cavity at about said outlet end of said valve body, said tapered section having a cross section that increases in diameter in a direction that is downstream from said inlet end, said shaft including four separate air passages through which air can flow downstream from said inlet end of said valve body toward said outlet end;
said valve assembly having an elastomeric seal that is mounted around said tapered section to reciprocate on said tapered section, said tapered section biasing said elastomeric seal to a normal position in sealing contact with said inside chamfer of said valve body and said tapered section to prevent air from flowing downstream from said inlet end out said outlet end;
said valve assembly allowing air to flow downstream from said inlet end and out said outlet end of said valve body when the air compressor produces an amount of air pressure necessary to create a force against said elastomeric seal that is sufficient to cause said seal to be located at a position away from said valve body along said tapered section and to create a preselected clearance between said valve body and said seal;
a pressure chamber that is the portion of said valve cavity that is located upstream of and about adjacent said elastomeric seal;
said elastomeric seal having an outside surface area, said seal being positioned to allow more of said outside surface area to be exposed to air pressure produced by the air compressor when said elastomeric seal is not in the normal position and in sealing contact with said chamfer than when said elastomeric seal is in the normal position and in sealing contact with said chamfer;
said tapered section including a restrictor to restrict further movement of said elastomeric seal in a direction that is downstream and away from said inlet end of said valve body when said elastomeric seal is separated from said chamfer by a preselected valve clearance; and
the portion of said valve cavity, between about said inlet end and about the location where said elastomeric seal contacts said chamfer, having a minimum cross sectional area that allows the pressure of air flowing through the preselected clearance continuous to be sufficient to continuously remove air from said valve cavity to prevent substantial accumulation of back pressure produced by the air compressor upstream of said valve when repeated cycles of the compression cylinder of said air compressor repeatedly cause said seal to be located at a position away from the valve body and create the preselected clearance between said valve body and said seal.

74. The check valve of claim 73 wherein said tapered section includes at least a first tapered segment and at least a second tapered segment, said first tapered segment having an incident angle that is different from an incident angle of said second tapered segment.

75. The check valve of claim 73 wherein said tapered section includes at least a first tapered segment and at least a second tapered segment, said second tapered segment having an incident angle that is shallower than an incident angle of said first tapered segment.

76. The check valve of claim 73 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

77. The check valve of claim 73 wherein said tapered section includes at least a first tapered segment, a second tapered segment, and a third tapered segment, said second tapered segment having an incident angle that is shallower than an incident angle of said first tapered segment, said third tapered section having an incident angle that is shallower than said incident angle of said second tapered section.

78. The check valve of claim 73 wherein said tapered section has a curved cross sectional shape.

79. A check valve for use between an air compressor and an air receiver that stores air, said check valve comprising:
- a valve body having an inlet end connectable to the air compressor and an outlet end connectable to the air receiver, and a valve cavity within said valve body extending between said inlet end and said outlet end;
- a valve pressure chamber located in said valve cavity at about the outlet end of said valve body;
- a valve assembly mounted at a position with respect to said valve cavity which enables said valve assembly to control the flow of air through said valve cavity, said valve assembly having a plug having at least a tapered section that increases in diameter in a direction that extends away from said inlet end, said plug extending across the diameter of said valve cavity at about said outlet end of said valve body, said plug having at least an air passage to allow for air to pass therethrough;
- an edge of said pressure chamber located at about said outlet end of said valve body;
- said valve assembly including an elastomeric seal that is mounted around said tapered section to reciprocate on said tapered section, said tapered section biasing said elastomeric seal to a normal position in sealing contact with said edge of said pressure chamber and said tapered section to prevent air from flowing downstream from said inlet end of said valve body through said valve cavity and out said outlet end, said elastomeric seal being movable along said tapered section away from sealing contact with said edge of said pressure chamber in response to a cracking pressure produced within said pressure chamber;
- the air compressor being capable of producing at least a clearance pressure, that is greater than said cracking pressure, to move said elastomeric seal a distance away from the normal position to cause a preselected clearance between said elastomeric seal and said edge of said pressure chamber, the amount of air flowing from said inlet end out said outlet end of said valve body when said preselected clearance exists between said elastomeric seal and said edge remains continuous when the compressor produces the clearance pressure;
- a restrictor located on said tapered section to restrict further movement of said elastomeric seal in a direction that is away from said inlet end of said valve body when a preselected valve clearance exists between said elastomeric seal and said edge of said pressure chamber; and
- said elastomeric seal includes an outside surface area, said elastomeric seal being positioned to allow more of said outside surface area to be exposed to air pressure produced by the air compressor when said elastomeric seal is not in the normal position and in sealing contact with said edge of said pressure chamber than when said elastomeric seal is in the normal position and in sealing contact with said edge of said pressure chamber.

80. The check valve of claim 79 further comprising a washer insert at about the outlet end of said valve body, said washer insert forming said face of said valve body, said washer insert also forming at least part of said pressure chamber and said edge.

81. The check valve of claim 79 further comprising a flange extension at about the outlet end of said valve body, said flange extension also forming at least part of said pressure chamber and said edge.

82. The check valve of claim 79 wherein said tapered section includes at least a first tapered segment and at least a second tapered segment, said first tapered segment having an incident angle that is different from an incident angle of said second tapered segment.

83. The check valve of claim 79 wherein said tapered section includes at least a first tapered segment and at least a second tapered segment, said second tapered segment having an incident angle that is shallower than an incident angle of said first tapered segment.

84. The check valve of claim 79 wherein said tapered section includes at least a first tapered segment, at least a second tapered segment, and at least a third tapered segment, said first tapered segment having an incident angle that is different than an incident angle of said second tapered segment, said second tapered segment having an incident angle that is different than said incident angle of said third tapered segment.

85. The check valve of claim 79 wherein said tapered section includes at least a first tapered segment, a second tapered segment, and a third tapered segment, said second tapered segment having an incident angle that is shallower than an incident angle of said first tapered segment, said third tapered section having an incident angle that is shallower than said incident angle of said second tapered section.

86. The check valve of claim 79 wherein said tapered section has a curved cross sectional shape.

\* \* \* \* \*